United States Patent
Earle et al.

(10) Patent No.: US 6,998,497 B2
(45) Date of Patent: Feb. 14, 2006

(54) METAL BIS-TRIFLIMIDE COMPOUNDS AND METHODS FOR SYNTHESIS OF METAL BIS-TRIFLIMIDE COMPOUNDS

(75) Inventors: Martyn J. Earle, Belfast (GB); Barry Joseph Mcauley, Co Antrim (GB); Alwar Ramani, Belfast (GB); Kenneth Richard Seddon, Co Down (GB); Jillian M. Thomson, Co Antrim (GB)

(73) Assignee: The Queen's University of Belfast, Belfast (GB)

( * ) Notice: Subject to any disclaimer, the term of this patent is extended or adjusted under 35 U.S.C. 154(b) by 0 days.

(21) Appl. No.: 10/471,257

(22) PCT Filed: Mar. 12, 2002

(86) PCT No.: PCT/GB02/00989

§ 371 (c)(1),
(2), (4) Date: Feb. 25, 2004

(87) PCT Pub. No.: WO02/072260

PCT Pub. Date: Sep. 19, 2002

(65) Prior Publication Data

US 2004/0138433 A1 Jul. 15, 2004

(30) Foreign Application Priority Data

Mar. 12, 2001 (GB) .............................. 0106000
Mar. 12, 2001 (GB) .............................. 0106001

(51) Int. Cl.
*C07F 15/00* (2006.01)
*C07F 13/00* (2006.01)
*C07F 1/00* (2006.01)
*C23C 16/00* (2006.01)

(52) U.S. Cl. .............................. 556/1; 556/42; 556/45; 556/57; 556/111; 556/136; 556/139; 534/11; 534/15; 427/248.1; 427/587

(58) Field of Classification Search .................... 556/1, 556/42, 45, 111, 136, 139, 57; 534/11, 15; 427/248.1, 587
See application file for complete search history.

(56) References Cited

FOREIGN PATENT DOCUMENTS

| EP | 0 834 492 A2 | 10/1997 |
|---|---|---|
| EP | 1 122 239 A2 | 8/2001 |
| EP | 1 122 240 A2 | 8/2001 |
| JP | 09 169690 | 6/1997 |
| JP | 9176063 | 7/1997 |
| JP | 09 188683 | 7/1997 |
| JP | 9241184 | 9/1997 |
| WO | PCT/CA97/01013 | 12/1997 |
| WO | PCT/EP97/06227 | 5/1998 |
| WO | PCT/US99/02712 | 8/1999 |
| WO | PCT/US99/29156 | 6/2000 |

OTHER PUBLICATIONS

Mikami, et al.; Metal Bis(trifluoromethylsulfonyl) amides as Highly Efficient Lewis Acid Catalysts for Acylation; Feb., 1996; Synlett.

Ishihara et al.; Scandium Trifluoromethanesulfonimide and Scandium Trifluoromethanesulfonate as Extremely Active Acetalization Catalysts; Sep., 1996; Synlett.

Grieco et al.; Magnesium Trifluoromethanesulfonimide (Triflimide) Promoted Substitution Reactions of Allylic and Benzylic Acetates. Magnesium Triflimide as a Substitute for Magnesium Perchlorate; 1997; Tetrahedron Letters.

*Primary Examiner*—Porfirio Nazario-Gonzalez
(74) *Attorney, Agent, or Firm*—Hodgson Russ LLP

(57) ABSTRACT

A metal bis-triflimide compound having the formula: $[M_x]^{n+}[(N(SO_2CF_3)_2)_{(nx-yz)}]^{(nx-yz)-}[L_y]^{z-}$ where M is a metal selected from the metals in groups 5 to 10, 12 and 14 to 16 and Cu, Au, Ca, Sr, Ba, Ra, Y, La, Ac, Hf, Rf, Ga, In, Tl, Ce, Pr, Nd, Pm, Sm, Eu, Gd, Tb, Dy, Ho, Er, Tm, Lu and the actinides; L is a negative or neutral ligand; n is 2,3,4,5, 6,7 or 8; x is greater than or equal to 1 y is 0,1,2,3,4,5,6,7 or 8; and z is 0,1,2,3 or 4.

26 Claims, 7 Drawing Sheets

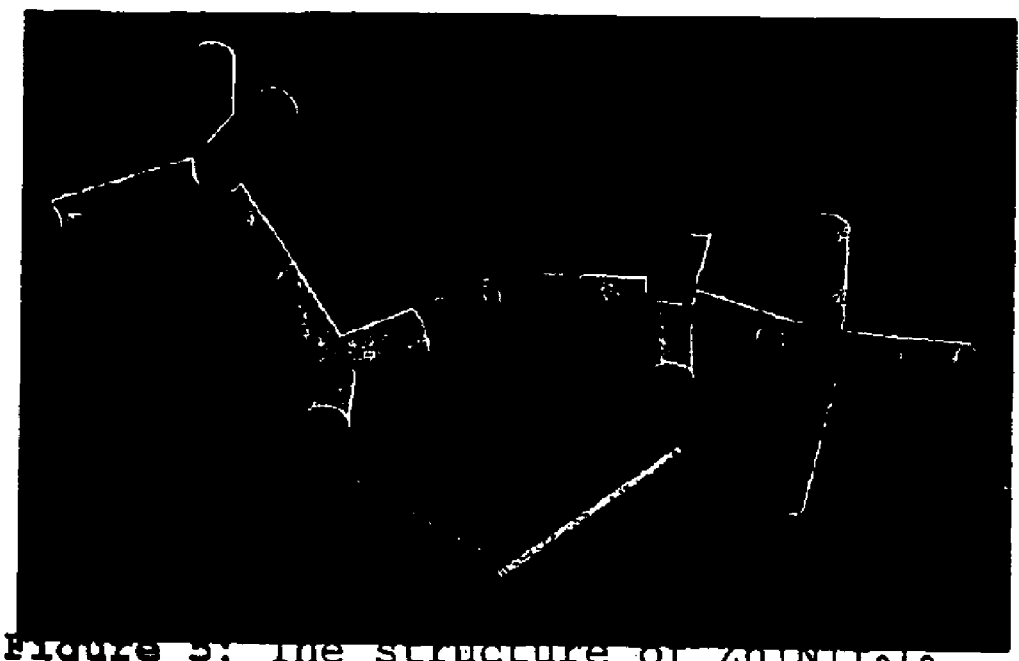
Figure 5: The structure of Zn(NH$_2$)$_2$.

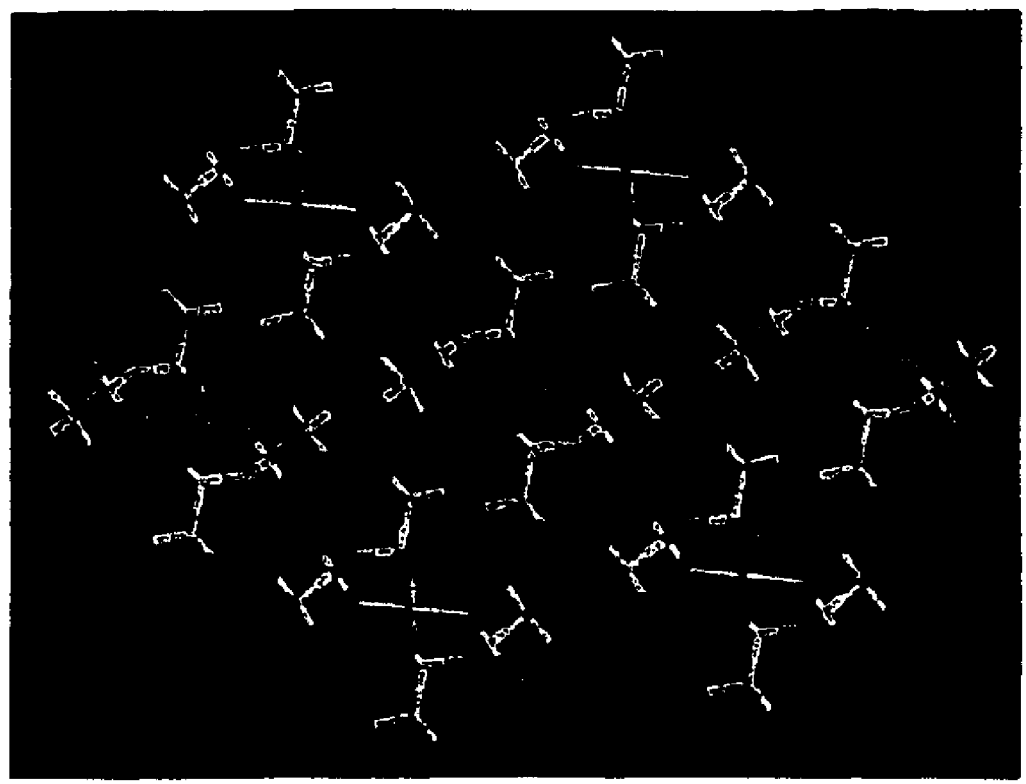
Figure 6, The structure of Zn(NTf$_2$)$_2$.

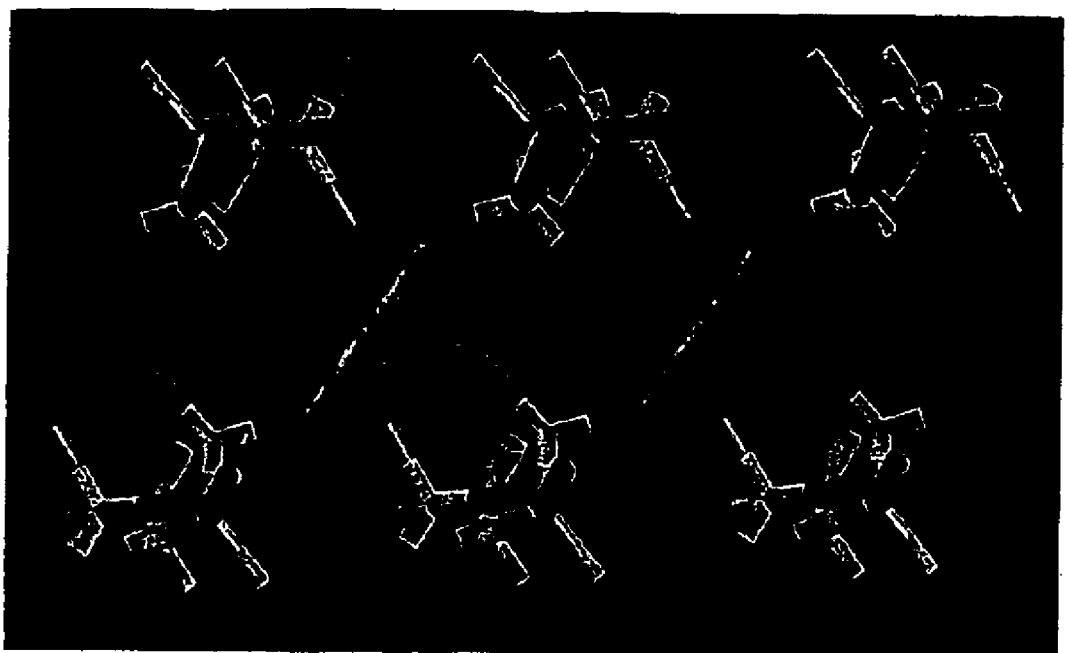
Figure 7: The structure of $Zn(NTf_2)_2$.

METAL BIS-TRIFLIMIDE COMPOUNDS AND METHODS FOR SYNTHESIS OF METAL BIS-TRIFLIMIDE COMPOUNDS

The present invention relates to metal bis-triflimide compounds and methods for the synthesis of metal bis-triflimide compounds.

A few metal bistriflimide compounds are known. WO 99/40124 discloses titanium and zirconium bistriflimides and the production of these by reacting $AgN(SO_2CF_3)_2$ with $R^1R^2MCl_2$ where M is Ti or Zr; $R^1$ is indenyl, cyclopentadienyl or pentamethylcylcopentadienyl and $R^2$ is independently indenyl, cyclopentadienyl, pentamethylcyclopentadienyl, methyl, methoxy, hydroxy, 2,4,6-trimethylphenoxy, trifluroethoxy, hexafluroisopropoxy or chloro. Aluminium bistriflimide and Yttberium bistriflimide are known (Synlett, February 1996, p 171). Scandium bistriflimide is also known (Synlett, September 1996, page 839). Magnesium and lithium bistriflimide are known (Tetrahedron letters 1997, p 2645).

The catalysis of chemical reactions is of major importance in chemistry. The compounds of certain metals are known to act as Lewis acids (electron pair acceptors), which interact with the reactants (and products) of a reaction, producing a reaction rate enhancement and/or selectivity enhancement. Also salts of metals which can exist in variable oxidation states (such as transition metals) are known to catalyse chemical reactions. Examples of these reactions are Friedel-Crafts, oxidation, reduction, Diels-Alder, isomerisation, coupling, addition and elimination reactions. Catalysts come in two general categories; homogeneous where the catalyst is in the same phase as the reactants and/or products, and heterogeneous, where the catalyst is in a separate phase from the reactants and/or products. Homogeneous catalysts are characterised by properties such as high reactivity and turnover, but difficult separation from the products of a reaction. Heterogeneous catalysts are characterised by properties such as lower reactivity and lower turnover, but relatively straightforward separation from the products of a reaction. There is a need for new catalysts having high reactivity and high turnover, that can easily be separated from reaction products.

The present invention provides a metal bistriflimide compound having the formula:

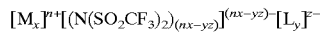

where M is a metal selected from the metals in groups 5 to 10, 12 and 14 to 16 of the periodic table and Cu, Au, Ca, Sr, Ba, Ra, Y, La, Ac, Hf, Rf, Ga, In, Tl, Ce, Pr, Nd, Pm, Sm, Eu, Gd, Tb, Dy, Ho, Er, Tm, Lu and the actinides;
L is a negative or neutral ligand;
n is 2,3,4,5,6,7 or 8;
x is greater than or equal to 1
y is 0,1,2,3,4,5,6,7 or 8; and
z is 0,1,2,3 or 4.

By metal bistriflimide is also meant metal bis-trifluoromethanesulfonimide. M may represent more than one type of metal ion. M is preferably selected from groups 7, 8, 9, 10, 12 and 14 of the periodic table. By group 8 is meant the group containing Fe, Ru, Os, Hs; by group 9 is meant the group containing Co, Rh, Ir, $Mt_r$; etc. The cation is preferably in a +2, +3 or +4 oxidation state but may also be in a +1, +5, +6, +7 or +8 oxidation state. Preferably M is selected from Mn, Fe, Co, Ni, In, Zn and Pb. More preferably M is selected from Mn(II), Fe(III), Co(II), Ni(II), In(III). Examples of compounds according to the present invention are calcium bis-triflimide, strontium bis-triflimide, barium bis-triflimide, gallium bis-triflimide, indium bis-triflimide, scandium bis-triflimide, yttrium bis-triflimide, lanthanum bis-triflimide, cerium bis-triflimide, chromium bis-triflimide, manganese bis-triflimide, iron bis-triflimide, cobalt bis-triflimide, nickel bis-triflimide, copper bis-triflimide, zinc bis-triflimide, cadmium bis-triflimide, tin bis-triflimide, lead bis-triflimide, and bismuth bis-triflimide.

L may be selected from oxos (such as $VO^{2+}$), phosphines (such as triphenylphosphine), water, halides or ketones. The ligand may originate from a solvent, reagent or by-product in the reaction mixture for making the catalyst or the reaction mixture in which the ligand is used.

The compounds of the present invention have not been produced before. These compounds have been found to be particularly effective catalysts for reactions that are conventionally catalysed by Lewis acids. They are suitable for many Lewis acid catalysed or Lewis acid mediated chemical transformations. They possess advantages over Lewis acids such as aluminium(III) chloride in that they do not form excessively strong complexes with the reactants or products of a chemical transformation. They are particularly suitable for use in Friedel crafts reactions such as the acylation or alklation of aromatic compounds. They may also be used for the sulfonylation of aromatic compounds. In Friedel-Crafts acylation reactions the "catalyst" is usually a stoichiometric reagent. However, catalyst loading can now be lower; as low as 1 mol % metal bis-triflimide can give rise to quantitative yields in Friedel-Crafts acylation reactions. The compounds of the present invention will catalyse chemical reactions in concentrations within the range 0.0000001 to 1000 mol %, preferably within the range of 0.1 to 20 mol % and more preferably within the range of 0.5 to 5 mol %. This reduces catalyst waste. As many of the metal bis-triflimide compounds possess metals that can exist in variable oxidation states, this makes them suitable for oxidation and reduction chemical transformations. Other chemical transformations that can be achieved with metal bis-triflimide compounds include, isomerisation reactions, coupling reactions, de-coupling, condensation (including the aldol and Claisen condensations), polymerisation, oligomerisation, dimerisation, addition, elimination, addition/elimination, hydration, dehydration, hydrogenation, dehydrogenation, halogenation, sulfonation and nitration.

The metal bis-triflimide compounds of the present invention may be soluble or partially soluble or insoluble in the reactants or products. In such a case they can act as both solvent and catalyst. They may be soluble, insoluble or partially soluble in a molecular solvent or solvents including supercritical solvents, or may be dissolved or suspended in an ionic liquid (molten salt that is in a liquid state at the reaction temperature and usually (but not essentially) molten at or near room temperature, i.e., 20° C.). In all these cases the metal bis-triflimide compound may act as a catalyst or reagent that effects chemical transformation. When the compounds of the present invention are soluble or partially soluble in the reactants, the reaction can proceed in the absence of a solvent. Alternatively, the compounds may be dissolved or suspended in an ionic liquid and the reaction can proceed in an alternative medium to that provided by conventional solvents such as dichloromethane. Therefore the compounds of the present invention provide the advantage that they can be used in solvent-free conditions or in the presence of ionic liquids thus obviating the need for the use of explosive solvents such as nitromethane and toxic solvents such as dichloromethane. Furthermore, when used reactions in solvent-free conditions or in the presence of ionic liquids, the metal bis-triflimides of the present invention are easily recycled.

In particular, the X-ray crystallographic structure of a new metal bis-triflimide salt, $Zn(N(SO_2CF_3)_2)_2$ has been investigated and it is thought to give rise to its excellent catalytic properties. The structure of metal bis-triflimide compounds is thought to be similar to that of zinc bis-triflimide, the X-ray crystallographic structure of which is shown in FIGS. 5 to 7.

As can be seen from the structure of zinc(II) bis-triflimide, it is made of two bis-triflimide groups coordinating to the metal through the oxygen atoms of the bis-triflimide ion (and not the nitrogen atom). The two remaining octahedral coordinating sites on the metal atom, are filled with oxygen atoms from adjacent $Zn(NTf_2)_2$ groups. As some of the metal bis-triflimides compounds are volatile, it is believed that the coordination from adjacent metal bis-triflimide groups may be fairly weak.

The compounds of the present invention are volatile and are therefore suitable for use in a process of vacuum deposition of metals or metal compounds on solid surfaces. This may be achieved by sublimation of the metal compound onto the solid surface and, if desired, removal of the non-metallic part of the compound. The compounds of the present invention are volatile, particularly at temperatures below 1000° C., more particularly at temperatures under 400° C., under vacuum or at atmospheric pressure. Table 1 gives the boiling/sublimation points for metal bistriflimide compounds (dec. means decomposes)

TABLE 1

| Metal bistriflimide | Bp/° C. at 1 mmHg |
|---|---|
| $Mg(NTf_2)_2$ | 300 |
| $Ca(NTf_2)_2$ | 400 (dec.) |
| $Ni(NTf_2)_2$ | 280 |
| $Co(NTf_2)_2$ | 300 (dec.) |
| $Fe(NTf_2)_2$ | 280 |
| $Ni(NTf_2)_2$ | 280 |
| $Cu(NTf_2)_2$ | 180 (dec.) |
| $Zn(NTf_2)_2$ | 260 |
| $Cd(NTf_2)_2$ | 350 (dec.) |
| $Yb(NTf_2)_3$ | 270 |

This vacuum deposition process has applications in the microelectronic and semiconductor industries. The vacuum deposition process is suitable for any metal bistriflimide compound which decomposes before it boils.

The present invention also provides a process for the production of metal bistriflimide compounds which process comprises reacting
(a) hydrogen bistriflimide with a metal;
(b) hydrogen bistriflimide with a metal hydroxide;
(c) hydrogen bistriflimide with a metal sulfide; or
(d) hydrogen bistriflimide with a metal carbide.

This process is suitable for producing both the metal bistriflimide compounds of the present invention and already known metal bistriflimide compounds. The above process is therefore applicable to metal bistriflimide compounds where M is a metal selected from the metals in groups 1 to 16 of the periodic table and the lanthanides and the actinides.

Preferably the above process involves the interaction of a metal or a metal compound with bis-triflimide (bis-trifluoromethanesulfonimide or $(HN(SO_2CF_3)_2)$. Preferably the metal is a transition metal (d block or f block) or selected from the metals of groups 12 to 16. Preferably the metal is selected from Sn(IV), Fe(III), In(III), Hf(IV), Ti(IV) and W(VI).

The process can be carried out in a solvent such as water, alcohol, ester or a molecular supercritical solvent, e.g. carbon dioxide, or ionic solvent. The reaction may be carried out at room temperature or at an elevated temperature. If a solvent is used, the metal bis-triflimide compound may also be made by the interaction of hydrogen bis-triflimide and a metal compound in the absence of a solvent. The metal bis-triflimide compounds are separated from the solvent by evaporation of the solvent, usually by heating (to drive off water or another solvent), preferably under vacuum. Further purification may be achieved by vacuum distillation or vacuum sublimation of the metal bis-triflimide compound. Purification can also be achieved by some other physical or chemical process, for example, crystallisation.

The metal bis-triflimide compounds of the present invention can be generated and used in situ for the catalysis of chemical reactions or to bring about chemical transformations. This involves the addition of a metal compound (such as a metal halide, such as chloride, bromide, iodide or fluoride) to a source of the bis-triflimide ion (such as a bis-triflimide ionic liquid). Preferably the metal compound is a metal chloride. These in situ metal triflimide compounds have similar or greater catalytic activity to isolated metal triflimide compounds. The present invention therefore provides a process for the production of a metal bistriflimide catalyst comprising adding a metal or metal compound to a source of a bistriflimide ion such as a bistriflimide ionic liquid. An ionic liquid is a molten salt or mixture of salts that is in the liquid state at the temperature of the reaction. The ionic liquid consists of two components, which are a positively charged cation and a negatively charged anion. Preferably the cation is an organic cation and the anion is an organic or inorganic anion. That cation for the process is preferably a 1-alkylpyridinium (such as 1-hexylpyridinium) or 1,3-dialkylimidazolium cation such as 1-butyl-3-methylimidazolium [bmim] or 1-ethyl-3-methylimidazolium [emim]. Other cations for this process are other alkyl- or poly-alkylpyridinium, alkyl or poly-alkylimidazolium, alkyl or poly-alkylpyrazolium, alkyl or poly-alkyl ammonium, alkyl or poly-alkyl phosphonium, other ammonium, phosphonium cations, alkylated diazabicyclo-[5,4,0]-undec-7-ene and related cations, or any other cation that gives rise to compounds termed ionic liquids. The anion for the process is preferably one that is stable to chemical alteration during the reaction and imparts desirable physical characteristics to the ionic liquid. Some suitable anions for the ionic liquid are bis-trifluoromethanesulfonimide, bis-pentafluoroethanesulfonimide, hexafluorophosphate(V), tetrafluoroborate(III), trifluoromethanesulfonate, cyanamide, fluoro or perfluoroalkylsulfonate, halide, sulfate, hydrogensulfate, alkylsulfate, alkylsulfonate, arylsulfate, arylsulfonate, nitrate, carboxylate, phosphate, hydrogenphosphate, dihydrogenphosphate, alkylphosphate, alkylphosphonate, phosphonate, nitrite, arsenate, antimonate, haloaluminate, aluminate, borate, silcate, haloindate(III), gallate, alkylborate, halogallate or any other anion that gives rise to an ionic liquid. Preferably the ionic liquid or the catalyst or the ionic liquid and catalyst combination is insoluble in low- or non-polar organic solvents such as diethyl ether or hexane.

An example of the preformed bis-triflimide catalysis and in situ formed catalysis of the acylation of toluene with benzoyl chloride is shown below:

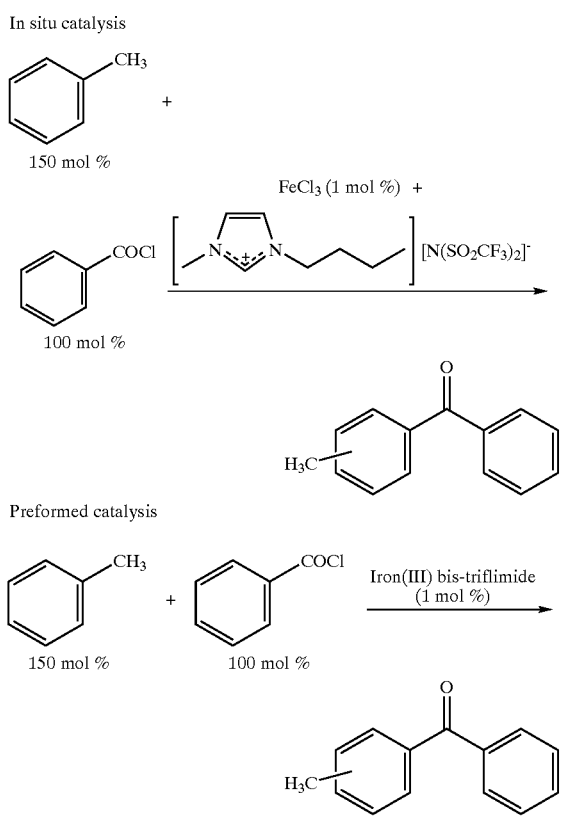

In this reaction, iron(III) chloride will not catalyse the reaction (very low yields are obtained) since the product (a ketone) forms a strong complex with the iron(III) chloride and renders it almost inactive. The addition of iron(III) chloride to a bis-triflimide source (hydrogen bis-triflimide {$HN(SO_2CF_3)_2$} or a bis-triflimide salt or ionic liquid results in the formation of an iron (III) triflimide complex (or iron(III) chloro bis-triflimide compounds or complexes). These iron (III) triflimide complex (or iron(III) chloro bis-triflimide compounds or complexes) can then be used as catalysts for chemical reactions, with acylation being an example. The rates of the reactions given in the above reaction scheme are similar and give high yields (99%).

This in situ catalyst method can be used for the synthesis and use of metal triflimide compounds allows metals that are not usually associated with Friedel-Crafts chemistry to be used as catalysts. Also difficult to isolate bis-triflimide compounds can be made and used as catalysts.

In many cases, the in situ method of forming metal bis-triflimide compounds is preferred over the isolation of the metal triflimide compound. For example, tin(IV) bis-triflimide is a difficult compound to isolate. If tin(IV) chloride is dissolved in a triflimide ionic liquid (for example [bmim][$NTf_2$]), the resulting mixture catalyses Friedel-Crafts acylation reactions. This is shown in FIG. 4, where the yield versus time, of five in situ metal triflimide compounds that catalyse the reaction of benzoyl chloride with toluene is shown (Examples 45–50).

The present invention is illustrated in the following examples. Examples 1 to 26 are examples of the reactivity of the new metal bistriflimide compounds according to the present invention. Examples 27 to 50 are methods of preparing metal bistriflimide catalysts according to the present invention.

FIGS. 5, 6 and 7 show the structure of $Zn(NTf_2)_2$

EXAMPLE 1

Figure 1:
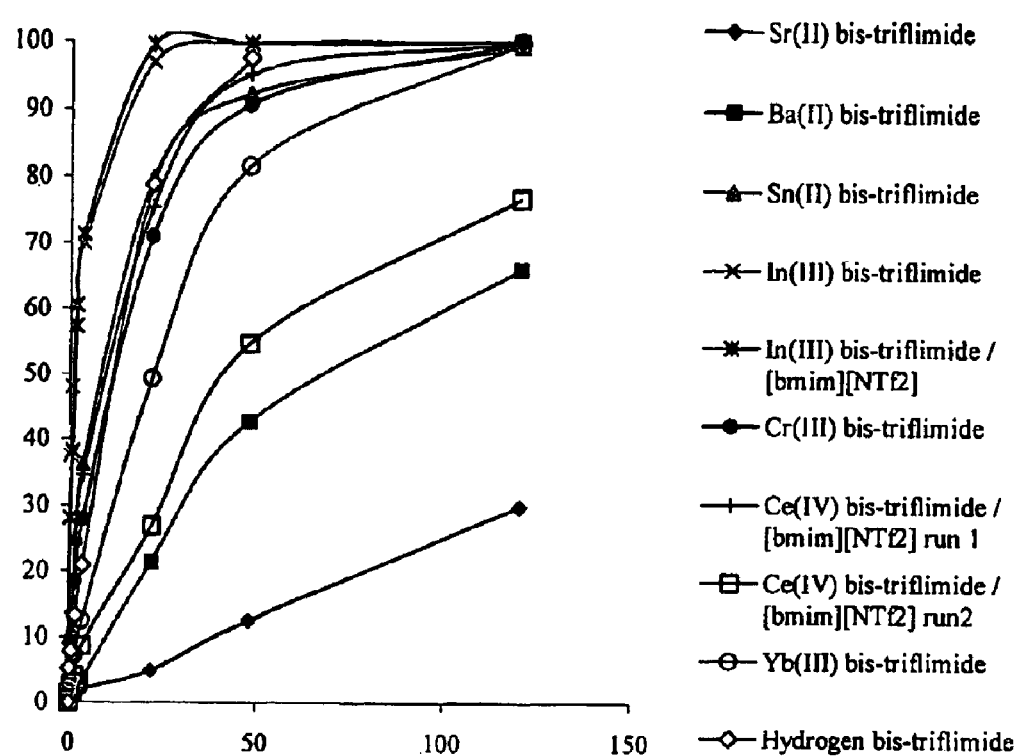
FIG. 1 shows the variation of yield with time in the metal bis-triflimide catalysed reaction of benzoyl chloride with toluene.

The Reaction of Toluene with Benzoyl Chloride with Cobalt(II) bis-triflimide Catalyst Cobalt(II) bis-triflimide (0.13 g, 0.21 mmol) was added to toluene (3.0 g, 32.5 mmol) and benzoyl chloride (3.0 g, 21.3 mmol) in a 25 $cm^3$ round bottomed flask equipped with a magnetic stirrer and reflux condenser. The mixture was heated under reflux for 3 hours (judged to be at least 99% complete by gas chromatographic analysis), and cooled to room temperature. Petroleum ether (15 $cm^3$, bp=40–60° C.) was added and the catalyst precipitated out of solution. The solution of the product was decanted and the flask washed with a further 15 $cm^3$ of petroleum ether. The solvent was evaporated from the combined petroleum ether extracts and the product purified by vacuum distillation (bp=160–170° C. @ 1 mmHg) in a Kugelrohr apparatus. This gave methyl-benzophenone (4.05 g, 97% isolated yield). The catalyst can be reused immediately by adding toluene and benzoyl chloride to the flask (containing the precipitate) and repeating the reaction.

EXAMPLE 2

The Reaction of Toluene with Benzoyl Chloride with Cobalt(II) bis-triflimide Catalyst in [emim][$NTf_2$]

Cobalt(II) bis-triflimide (0.13 g, 0.21 mmol) was added to 1-ethyl-3-methylimidazolium bis-trifluoromethanesulfonimide ([emim][$NTf_2$]) (2.0 g) in a 25 $cm^3$ round-bottomed flask equipped with a magnetic stirrer and reflux condenser, and the mixture stirred until the catalyst dissolved. Toluene (3.0 g, 32.5 mmol) and benzoyl chloride (3.0 g, 21.3 mmol) were added. The mixture was heated under reflux for 0.5 hours (judged to be at least 99% complete by gas chromatographic analysis), and cooled to room temperature. Petroleum ether (15 $cm^3$, bp=40–60° C.) was added and the catalyst and ionic liquid formed a separate phase. The solution of the product was decanted and the flask (containing the ionic liquid and catalyst) washed three times with 15 $cm^3$ of petroleum ether. The solvent was evaporated from the combined petroleum ether extracts and the product purified by vacuum distillation (bp=160–170° C. @ 1 mmHg) in a Kugelrohr apparatus. This gave methylbenzophenone (4.02 g, 96%). The catalyst and ionic liquid combination can be reused immediately by adding toluene and benzoyl chloride to the flask and repeating the reaction, without loss of activity.

Examples 1 and 2 show that the acylation of toluene with benzoyl chloride can be carried out with a cobalt(II) bis-triflimide catalyst and that this can be performed with or without an ionic liquid present. However, with the ionic liquid, faster reaction rates are obtained and the catalyst can be recycled more easily. Without the ionic liquid, the products of this reaction are obtained in quantitative yield using 1 mol % catalyst after 3 hours heating under reflux (example 1). The reaction time is reduced to 30 minutes when the reaction is carried out in the ionic liquid [emim][NTf$_2$] ([emim]=1-ethyl-3-methylimidazolium) (example 2).

EXAMPLE 3

The Reaction of Toluene with Benzoyl Chloride with Nickel(II) bis-triflimide Catalyst in [emim][NTf$_2$]

Nickel(II) bis-triflimide (0.13 g, 0.21 mmol) was added to 1-ethyl-3-methylimidazolium bis-trifluoromethanesulfonimide ([emim][NTf$_2$]) (2.0 g) 25 cm$^3$ in a round-bottomed flask equipped with a magnetic stirrer and reflux condenser, and the mixture stirred until the catalyst dissolved. Toluene (3.0 g, 32.5 mmol) and benzoyl chloride (3.0 g, 21.3 mmol) were added. The mixture was heated under reflux for 1 hour (judged to be at least 99% complete by gas chromatographic analysis), and cooled to room temperature. Petroleum ether (15 cm$^3$, bp=40–60° C.) was added and the catalyst and ionic liquid formed a separate phase. The solution of the product was decanted and the flask (containing the ionic liquid and catalyst) washed three times with 15 cm$^3$ of petroleum ether. The solvent was evaporated from the combined petroleum ether extracts and the product purified by vacuum distillation (bp=160–170° C. @ 1 mmHg) in a Kugelrohr apparatus. This gave methylbenzophenone (4.04 g, 97% isolated yield). The catalyst and ionic liquid combination can be reused immediately by adding toluene and benzoyl chloride to the flask and repeating the reaction, without loss of activity.

The results from Examples 2 and 3 are shown in Table 1.

TABLE 1

The gas chromatographic (GC) yields of benzophenones derived from the reaction of benzoyl chloride with toluene with 1% metal bis-triflimide catalyst in [emim][NTf$_2$].

| Compound | Yield | Time/h |
|---|---|---|
| Co(NTf$_2$)$_2$ | 99 | 0.5 |
| Ni(NTf$_2$)$_2$ | 99 | 1 |

EXAMPLE 4

Anisole (0.30 cm$^3$, 2.8 mmol), acetic anhydride (0.50 cm$^3$, 5.0 mmol), M(NTf$_2$)$_n$ catalyst (0.1375 mmol (M=Al, n=3; M=Zn, n=2; M=Yb, n=3; M=Y, n=3)) were dissolved in the ionic liquid [bmim][PF$_6$]. These four reactions were heated at 30° C. for 24 hours. The course of the reaction was determined by HPLC analysis of the reaction mixture and the yields are shown in Table 2.

TABLE 2

The variation of GC yield with time for the acetylation of anisole with acetic anhydride with metal bis-triflimide catalysts in [bmim][PF$_6$].

| Catalyst | % Yield (35 min) | % Yield (115 min) | % Yield (245 min) | % Yield (1375 min) |
|---|---|---|---|---|
| Al(NTf$_2$)$_3$ | 45 | 55 | 61 | 63 |
| Zn(NTf$_2$)$_3$ | 23 | 36 | 44 | 61 |
| Yb(NTf$_2$)$_3$ | 49 | 61 | 64 | 69 |
| Y(NTf$_2$)$_3$ | 55 | 62 | | 71 |

EXAMPLE 5

Anisole (0.50 cm$^3$, 4.6 mmol), benzoic anhydride (1.15 g, 5.06 mmol), M(NTf$_2$)$_n$ catalyst (0.23 mmol (M=Al, n=3, 0.20 g; M=Ce, n=4, 0.29 g)) were dissolved in the ionic liquid [bmim][NTf$_2$] (2.0 g). These two reactions were heated at 60° C. for 24 hours. The course of the reaction was determined by gas chromatographic analysis of the reaction mixture and the yields are shown in Table 3.

TABLE 3

The variation of GC yield with time for the benzoylation of anisole with benzoic anhydride with metal bis-triflimide catalysts in [bmim][PF$_6$].

| Catalyst | % Yield (60 min) | % Yield (120 min) | % Yield (180 min) | % Yield (1350 min) |
|---|---|---|---|---|
| Al(NTf$_2$)$_3$ | 44 | 62 | 67 | 68 |
| Ce(NTf$_2$)$_4$ | 32 | 49 | 56 | 84 |

EXAMPLE 6

Fluorobenzene (5.77 g, 60 mmol), 4-fluorobenzoyl chloride (4.75 g, 30 mmol), ZnCl$_2$ (1.36 g, 10 mmol) and [emim][NTf$_2$] were placed in an autoclave and heated with stirring for 48 hours at 160° C. The reactor was cooled and the pressure (HCl gas) released. Gas chromatographic analysis showed that a 99% conversion to a mixture of 2,4'-difluorobenzophenone, 3,4'-difluorobenzophenone, 4,4'-difluorobenzophenone in 17:8:75 ratio respectively. The difluorobenzophenones were isolated by solvent extraction with petroleum ether (bp=40–60° C.), followed by evaporation of the solvent. The ionic liquid/zinc chloride catalyst system could be used in further reactions, with similar activity. This result shows that the classically unreactive aromatic compound fluorobenzene can be acylated with 4-fluorobenzoyl chloride to give isomers of 2-, 3-, or 4-4'-difluorobenzophenone in [emim][NTf$_2$] using an in situ zinc catalyst. This catalyst was generated by dissolving zinc(II) chloride in the [emim][NTf$_2$] ionic liquid. The reaction gave a 95% yield (17:8:75 o-, m-, p- isomer ratio).

EXAMPLE 7

Benzoic acid (0.31 g, 2.5 mmol), m-xylene (0.53 g, 5.0 mmol), [bmim][NTf$_2$] (0.50 g) and M(NTf$_2$)$_2$ (M=Co (0.14 g, 0.25 mmol), or Zn (0.15 g, 0.25 mmol) were placed in flasks equipped with stirrers and condensers. The contents of the flask were heated under reflux (ca 140–150° C.) for 2 days, then cooled to room temperature. The products were analysed by gas chromatographic analysis and found to give 93 and 87% conversions (for Co and Zn bis-triflimide reactions respectively) to 2,4-dimethylbenzophenone and, it is believed to be, 2,6-dimethylbenzophenone (11:1 isomer ratio in both cases). The results show that zinc and cobalt bis-triflimide have been found to catalyse the benzoylation of m-xylene with benzoic acid. The reaction is slower that the corresponding reaction with benzoyl chloride. The catalyst was recycled and the reaction was repeated. The results of the repeat experiment are shown in Table 4.

TABLE 4

The yields of benzophenones derived from the
reaction of benzoic acid with m-xylene with 10%
recycled metal bis-triflimide catalyst in
[bmim][NTf$_2$] at 140° C. for 48 hours.

| Compound | % Yield | 2,4- to 2,6- ratio |
|---|---|---|
| Zn(NTf$_2$)$_2$ | 40 | 11:1 |
| Co(NTf$_2$)$_2$ | 82 | 11:1 |

These are remarkable results given the low reactivity of benzoic acid. It is to be noted that this reaction produces water s a byproduct and as such it is a very environmentally friendly reaction. Furthermore, it utilises a non-corrosive starting material (benzoic acid) and therefore is a safer reaction to perform than the corresponding reaction with benzoyl chloride. It can be concluded that this is superior way to produce dimethylbenzophenone.

EXAMPLE 8

The Reaction of Toluene with Benzoyl Chloride with Zinc(II) or Copper(II) bis-triflimide Catalyst in [emim][NTf$_2$]

Copper or zinc (II) bis-triflimide (0.13 g, 0.21 mmol) was added to a mixture of toluene (3.0 g, 32.5 mmol) and benzoyl chloride (3.0 g, 21.3 mmol). The mixture was heated under reflux for 72 hours (the reaction was monitored by gas chromatographic analysis, by taking a drop of the reaction mixture and suspending it in petroleum ether (b.p.=40–60° C.) and filtering off the catalyst. The starting materials and products, which are soluble in the petroleum ether extract, were cooled to room temperature. Petroleum ether (15 cm$^3$, bp=40–60° C.) was added and the catalyst and formed a separate phase. The solution of the product was decanted and the flask (containing the catalyst) washed three times with 15 cm$^3$ of petroleum ether. The solvent was evaporated from the combined petroleum ether extracts and the product purified by vacuum distillation (bp=160–170° C. @ 1 mmHg) in a Kugelrohr apparatus. This gave methylbenzophenone (4.0 g, 95%). The catalyst can be reused immediately by adding toluene and benzoyl chloride to the flask and repeating the reaction, without loss of activity. The yields as determined by gas chromatographic analysis are shown in Table 5.

TABLE 5 the yields of benzophenones derived from the reaction
of benzoyl chloride with toluene with 1% copper(II) or
1% zinc(II) bis-triflimide catalysts. The figure in
brackets refers to the o-, m- and p- isomer ratios.

| Time/h | Yield with Zn(NTf$_2$)$_2$ | Yield with Cu(NTf$_2$)$_2$ |
|---|---|---|
| 24 | 83 | 52 |
| 48 | 99 (22:1:77) | |
| 72 | | 99 (20:2:78) |

Zinc(II) and copper(II) bis-triflimide compounds were found to be effective acylation catalysts for the benzoylation of toluene.

EXAMPLE 9

The Reaction of o-xylene with Benzoyl Chloride with an Aluminium(III) bis-triflimide Catalyst Aluminium (III) bis-triflimide (0.10 g) was added to a mixture of o-xylene (3.0 g, 28.2 mmol) and benzoyl chloride (3.0 g, 21.3 mmol). The mixture was heated at 120° C. for 18 hours (the reaction was monitored by gas chromatographic analysis, by taking a drop of the reaction mixture and suspending it in petroleum, ether (b.p.=40–60° C.) and filtering off the catalyst. The starting materials and product are soluble in the petroleum ether extract), and cooled to room temperature. Petroleum ether (15 cm$^3$) was added and the catalyst and formed a separate phase. The yields as determined by gas chromatographic analysis was 99% with a 6.0:1 3,4- to 2,3-dimethylbenzophenone isomer ratio. Aluminium(III) bis-triflimide was found to be an effective catalyst for the benzoylation of o-xylene. The reaction gave a quantitative yield of two isomers of the corresponding benzophenone (6:1 3,4- to 2,3- isomer ratio) after 18 h at 120° C., using 1 mol % of catalyst.

EXAMPLE 10

The Reaction of Toluene with Benzoyl Chloride with Metal bis-triflimide Catalyst Various metal (1-ethyl-3-methylimidazolium, Li, Mg, Ca, Mn, Co, Ni, Cu, Zn, Sn, Pb, Al) bis-triflimide salts (1 mol %) was added to a mixture of toluene (3.0 g, 32.6 mmol) and benzoyl chloride (3.0 g, 21.3 mmol). The mixture was heated at 110° C. for up to 120 hours. The reaction was monitored at regular intervals by gas chromatographic analysis and the reaction stopped when the reaction was judged to be 99% complete by cooling to room temperature. Petroleum ether (15 cm$^3$) was added and the catalyst and formed a separate phase. The product was isolated be decanting the petroleum ether extract, followed by Kugenrohr distillation at 1 mm Hg. The yields after various time intervals are given in Table 6. The product formed is methylbenzophenone. In all these reactions, the isomer ratio was found to be approximately 76% para and 24% ortho. This results are shown in Table 6. Table 1 lists the times required for Co and Ni bis-triflimide in [emim][NTf$_2$].

TABLE 6

The yields of benzophenones derived from the
reaction of benzoyl chloride with toluene with 1%
metal bis-triflimide catalyst.

| Compound | Yield/% | Time/h |
|---|---|---|
| [emim] [NTf$_2$] | <1 | 48 |
| Li NTf$_2$ | <5 | 120 |
| Mg(NTf$_2$)$_2$ | 99 | 48 |
| Ca(NTf$_2$)$_2$ | <5 | 120 |
| Mn(NTf$_2$)$_2$ | 99 | 5 |
| Co(NTf$_2$)$_2$ | 99 | 3 |
| Ni(NTf$_2$)$_2$ | 99 | 4 |
| Cu(NTf$_2$)$_2$ | 99 | 72 |
| Zn(NTf$_2$)$_2$ | 99 | 48 |
| Sn(NTf$_2$)$_2$ | 55 | 48 |
| Pb(NTf$_2$)$_2$ | 95 | 6 |
| Al(NTf$_2$)$_3$ | 99 | 24 |

From Table 6, a remarkable difference in reactivity between the compounds chosen is observed. Of these, four compounds appear to have unexpectedly high reactivity, namely those of manganese, cobalt, nickel and lead, whereas compounds such as zinc bis-triflimide and aluminium bis-triflimide have relatively modest activity. This is completely different to "conventional Friedel-Crafts chemistry" which would suggest that the Al bistriflimide should be the best catalyst. Of particular remark is the catalytic reactivity of Co and Pb. Lithium and calcium bis-triflimide in contrast show very poor activity and with [emim] [bis-triflimide], little or no reaction was observed.

EXAMPLE 11

The Reaction of Chlorobenzene with Benzoyl Chloride with Nickel(II) bis-triflimide Catalyst in [bmim][NTf$_2$]

Nickel(II) bis-triflimide (0.062 g, 0.1 mmol) was added to 1-butyl-3-methylimidazolium bis-trifluoromethanesulfonimide ([bmim][NTf$_2$]) (1.0 g) in a 25 cm$^3$ round-bottomed flask equipped with a magnetic stirrer and reflux condenser, and the mixture stirred until the catalyst dissolved. Chlorobenzene (1.68 g, 15 mmol) and benzoyl chloride (1.41 g, 10 mmol) were added. The mixture was heated under reflux for 72 hours and was analysed by gas chromatographic analysis as in previous examples. The reaction was cooled to room temperature. Petroleum ether (15 cm$^3$, bp=40–60° C.) was added and the catalyst and ionic liquid formed a separate phase from the petroleum ether layer. The solution of the product (in petroleum ether) was decanted and the flask (containing the ionic liquid and catalyst) washed three times with 15 cm$^3$ of petroleum ether. Concentration of the organic extract, followed by Kugenrohr distillation at 1 mm Hg (bp=170–190° C.), gave chlorobenzophenone (1.65 g, 74%). GC analysis showed 78% yield after 72 hours, with a 70:8 4- to 2- isomer ratio. This is a remarkable result, as chlorobenzene is known to be classically unreactive in acylation reactions. It has not previously been possible to isolate significant quantities of the products of the acylation of chlorobenzene.

EXAMPLE 12

The Reaction of Chlorobenzene with Benzoyl Chloride with Cobalt(II) bis-triflimide or Zinc(II) bis-triflimide Catalyst in [bmim][NTf$_2$].

In two separate reactions, either zinc(II) bis-triflimide (0.16 g, 5 mol %) or cobalt(II) bis-triflimide (0.15 g, 5 mol %) was added to 1-butyl-3-methylimidazolium bis-trifluoromethanesulfonimide ([bmim][NTf$_2$]) (1.0 g) 25 cm$^3$ in a round-bottomed flask equipped with a magnetic stirrer and reflux condenser, and the mixture was heated gently and stirred until the catalyst dissolved. Chlorobenzene (0.68 g, 6 mmol) and benzoyl chloride (0.72 g, 5 mmol) were added. The mixture was heated under reflux for 18 hours and was analysed by gas chromatographic analysis as in previous examples. The reaction was cooled to room temperature. Cyclohexane (15 cm$^3$) was added and the catalyst and ionic liquid formed a separate phase. The solution of the product was decanted and the flask (containing the ionic liquid and catalyst) washed three times with 15 cm$^3$ cyclohexane followed by Kugelrohr distillation at 1 mm Hg (bp=180–200° C.). This gave a mixture of 2- and 4-chlorobenzophenone. GC yield=97% (6.8:1 p- to o- isomer ratio) for cobalt catalyst and 55% (6.5:1 p- to o- isomer ratio) for the zinc catalyst.

The reaction of chlorobenzene with benzoyl chloride was investigated, as chlorobenzene is much more difficult to acylate. Although reasonable yields could be obtained with 1 mol % catalyst, it was found that 5-mol % catalyst gave more acceptable reaction rates. The reaction was found to be 95% complete with cobalt bis-triflimide after 18 hours and 55% complete with zinc bis-triflimide (Table 7). The catalyst was found to be less active after extracting the product with boiling cyclohexane and recycling the ionic liquid/catalyst. The activity of the catalyst was restored by adding a trace of hydrogen bis-triflimide (0.1 mol %).

TABLE 7

The yields of benzophenones derived from the reaction of benzoyl chloride with chlorobenzene with 5% metal bis-triflimide catalyst in [bmim][NTf$_2$].

| Compound | Yield | Time/h |
|---|---|---|
| Co(NTf$_2$)$_2$ | 95 | 18 |
| Zn(NTf$_2$)$_2$ | 55 | 18 |

EXAMPLE 13

The Reaction of Toluene with Benzoyl Chloride with Hydrogen and Metal bis-triflimide Catalyst Various metal bis-triflimide compounds: Sr(II), Ba(II), In(III), In(III) in [bmim][NTf$_2$], Cr(III), Ce(IV), Yb(III), and hydrogen bis-triflimide {HN(SO$_2$CF$_3$)$_2$} (1 mol %) were added to a mixture of toluene (1.38 g, 15.0 mmol) and benzoyl chloride (1.41 g, 10.0 mmol). The mixture was heated at 110° C. for up to 120 hours. The reaction was monitored at various intervals by gas chromatographic analysis and the reaction stopped after 5 days. The yields of methylbenzophenone with respect to time are shown in FIG. 1. The reaction of benzoyl chloride and toluene gave 2- and 4-methylbenzophenone. All these compounds were found to be active Friedel-Crafts catalysts, but with considerably different activities. Of these, the activities of indium(III) and iron(III) (Example 14) are the most notable, as they are exceptionally good catalysts. The p- to o-selectivities were in the range 3.9 to 4.4 to 1, with the indium and iron catalysts giving 4.4:1 selectivity.

EXAMPLE 14

The Reaction of Toluene with Benzoyl Chloride with Iron(III) bis-triflimide or Iron(III) Chloride Dissolved in [bmim][NTf$_2$]

Figure 2:
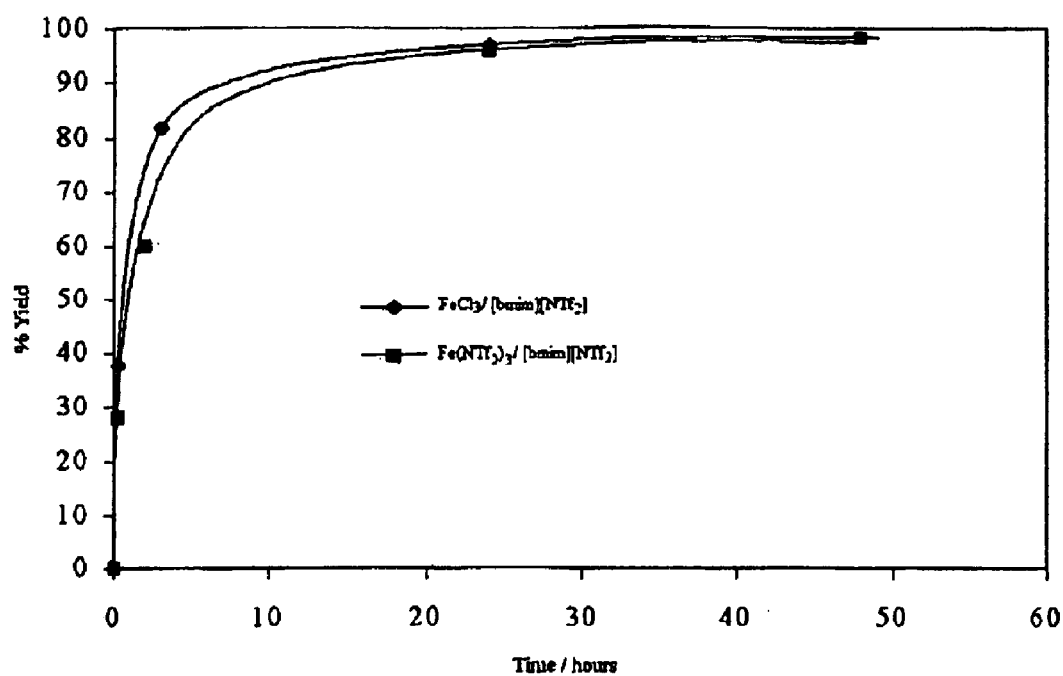
FIG. 2 shows the variation of yield with time in the 1% $FeCl_3$ and 1% Fe (III) bistriflimide catalysed reaction of benzoyl chloride with toluene in [bmim][$NTf_2$].

In two separate reactions, either iron(III) bis-triflimide (1 mol %) or iron(III) chloride (1 mol %) was added to 1-butyl-3-methylimidazolium bis-trifluoromethanesulfonimide ([bmim][NTf$_2$]) (1.0 g) 25 cm$^3$ in a round-bottomed flask equipped with a magnetic stirrer and reflux condenser, and the mixture was heated gently and stirred until the catalyst dissolved. Toluene (1.38 g, 15 mmol) and benzoyl chloride (1.41 g, 10 mmol) were added. The mixture was heated under reflux for 48 hours and was analysed by gas chromatographic analysis as in previous examples. The yield of methylbenzophenone with respect to time is shown in FIG. 2. Here, the activity of the iron catalyst was tested in two separate ways: (a) with 1% FeO(NTf$_2$) in [bmim][NTf$_2$] and (b) 1% FeCl$_3$ in [bmim][NTf$_2$]. In both cases, the activity and selectivity were similar, indicating that FeCl$_3$ and FeO(NTf$_2$) are possibly precursors to catalyst, when dissolved in excess [bmim][NTf$_2$].

EXAMPLE 15

The Reaction of Toluene with Methane Sulfonyl Chloride with Zinc(II) bis-triflimide Zinc(II) bis-triflimide (0.13 g, 2.5 mol %) was added to a round-bottomed flask equipped with a magnetic stirrer and reflux condenser. Toluene (1.38 g, 15 mmol) and methane sulfonyl chloride (1.14 g, 10 mmol) were added. The mixture was heated under reflux for 24 hours and was analysed by gas chromatographic analysis as in previous examples.

All the methane sulfonyl chloride had reacted and three isomers of (2-, 3- and 4-methylphenyl)methylsulfone had formed (yield=99%), isomer ratio=35:18:47 for the o-, m- and p- isomers. The product was extracted from the catalyst by dissolving it in cyclohexane (20 cm³) followed by decantation of the cyclohexane extract. The catalyst was washed with cyclohexane (2×20 cm³) and the combined cyclohexane extracts were concentrated on a rotary evaporator. The product was Kugelrohr distilled at 100–110° C. to give 1.62 g of a colourless oil (96% isolated yield).

EXAMPLE 16

The Reaction of Benzene with Benzene Sulfonyl Chloride with Zinc(II) bis-triflimide Zinc(II) bis-triflimide (0.062 g, 1 mol %) was dissolved in [bmim][NTf₂] (1.0 g) in a round-bottomed flask equipped with a magnetic stirrer and reflux condenser. Benzene (1.56 g, 20 mmol) and benzene sulfonyl chloride (1.76 g, 10 mmol) were added. The mixture was heated under reflux for 18 hours and was analysed by gas chromatographic analysis as in previous examples. All the benzene sulfonyl chloride had reacted diphenyl sulfone had formed (yield=99%). The product was extracted from the catalyst and ionic liquid by dissolving it in boiling cyclohexane (5×30 cm³) followed by decantation of the cyclohexane extract. The diphenylsulfone crystalised on cooling and was collected by filtration (2.03 g, 93% isolated yield). The reaction of benzene with benzene sulfonyl chloride gave the expected diphenyl sulfone in 99% yield with a Zn(NTf₂)₂ catalyst (18 h at reflux). The diphenyl sulfone was extracted with boiling cyclohexane and the ionic liquid and catalyst could be reused.

EXAMPLE 17

The Reaction of m-xylene with Benzene Sulfonyl Chloride with Zinc(II) bis-triflimide Zinc(II) bis-triflimide (0.062 g, 1 mol %) was dissolved in [bmim][NTf₂] (1.0 g) in a round-bottomed flask equipped with a magnetic stirrer and reflux condenser and m-xylene (2.12 g, 20 mmol) and benzene sulfonyl chloride (1.76 g, 10 mmol) were added. The mixture was heated under reflux for 18 hours and was analysed by-gas chromatographic analysis as in previous examples. All the benzene sulfonyl chloride had reacted and mostly 2,4-dimethyldiphenylsulfone had formed (yield=99%, 20:1 isomer ratio {by NMR}). The major product is shown below, the structure of the minor isomer is not known but is believed to be the 2,6-dimethyl isomer.

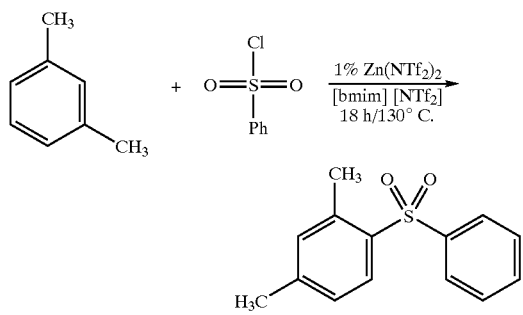

The product was extracted from the catalyst and ionic liquid by dissolving it in boiling cyclohexane (5×30 cm³) followed by decantation of the cyclohexane extract. The 2,4-dimethyldiphenylsulfone crystalised on cooling and was collected by filtration.

EXAMPLE 18

Figure 3:
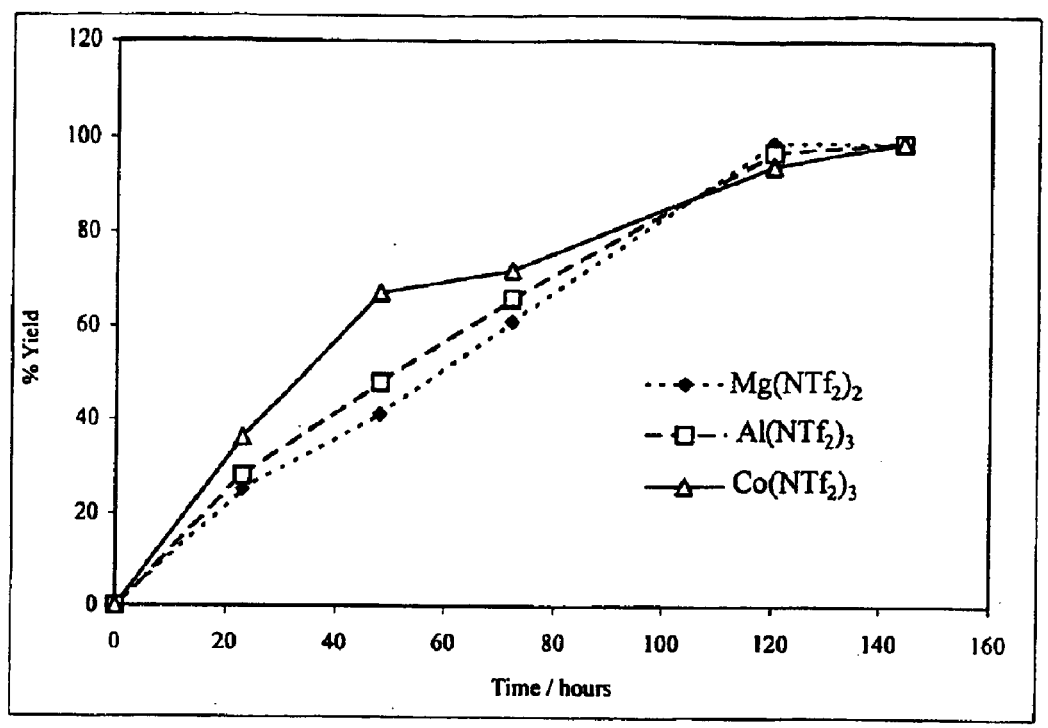
FIG. 3 shows the variation of yield with time in the synthesis of phenyl-4-chlorophenyl sulfone.

The Reaction of Chlorobenzene with Benzene Sulfonyl Chloride with Metal bis-triflimide Catalysts In three separate reactions, either magnesium(II) bis-triflimide (0.058 g, 0.1 mol), aluminium(III) bis-triflimide (0.87 g, 0.1 mmol) or cobalt(II) bis-triflimide (0.062 g, 0.1 mmol) was dissolved in [bmim][NTf₂] (0.5 g) in a round-bottomed flask equipped with a magnetic stirrer and reflux condenser. Chlorobenzene (1.68 g, 15 mmol) and benzene sulfonyl chloride (1.76 g, 10 mmol) were added. The mixture was heated under reflux for 144 hours and monitored by gas chromatographic analysis as in previous examples. The yields with respect to time are given in FIG. 3. The product was extracted from the catalyst and ionic liquid by dissolving it in boiling cyclohexane (4×10 cm³) followed by decantation of the cyclohexane extract. The 2- and 4-chlorodiphenylsulfone (9:1 p- to o- isomer ratio) crystalised on cooling and was collected by filtration. The selectivity was 9:1 for the p- isomer and the o- isomer was the minor isomer in all cases. Coincidently, the reaction of benzoyl chloride with chlorobenzene also gave the same selectivity and similar reaction rates. Phenyl-4-chlorophenylsulfone is an insecticide. The reaction was found to be slow using 1 mol % catalyst, but 5 mol % catalyst gave acceptable reaction rates. The metal salts chosen were aluminium(III), cobalt(II) and magnesium(II) bis-triflimide, in the ionic liquid [bmim][NTf₂]. All three catalysts were found to be effective for this reaction. The reaction is shown below.

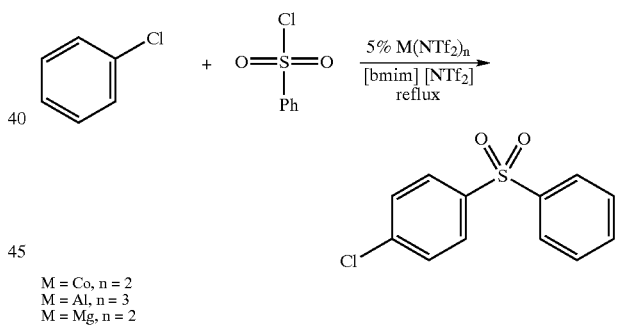

M = Co, n = 2
M = Al, n = 3
M = Mg, n = 2

EXAMPLE 19

The Reaction of Benzene with oct-1-ene with Nickel(II) bis-triflimide

Nickel(II) bis-triflimide (0.06 g, 0.1 mmol) was dissolved in [bmim][NTf₂] (1.0 g) in a round-bottomed flask equipped with a magnetic stirrer and reflux condenser. Benzene (3.90 g, 50 mmol) and oct-1-ene (1.12 g, 10 mmol) were added. The mixture was heated under reflux for 18 hours and was analysed by gas chromatographic analysis as in previous examples. The oct-1-ene peak disappeared and three isomers of octylbenzene were formed (70%, 20:26:54 2- to 3- to 4-isomer ratio) as well as octene dimer (30%). The less dense product phase was decanted from the ionic/catalyst phase and purified by Kugelrohr distillation. The ionic liquid and catalyst were prepared for reuse by heating at 60° C. under vacuum for 1 hour. The ionic liquid and catalyst were used for further reactions of benzene with oct-1-ene without loss of activity. This is an alkylation of benzene with an alkene using a metal bis-triflimide catalyst. Benzene and oct-1-ene react in the presence of 1% nickel(II) bis-triflimide in [bmim][NTf$_2$] to form three isomers of octyl benzene and a small amount of hexadecene (unknown isomeric distribution). This is shown below:

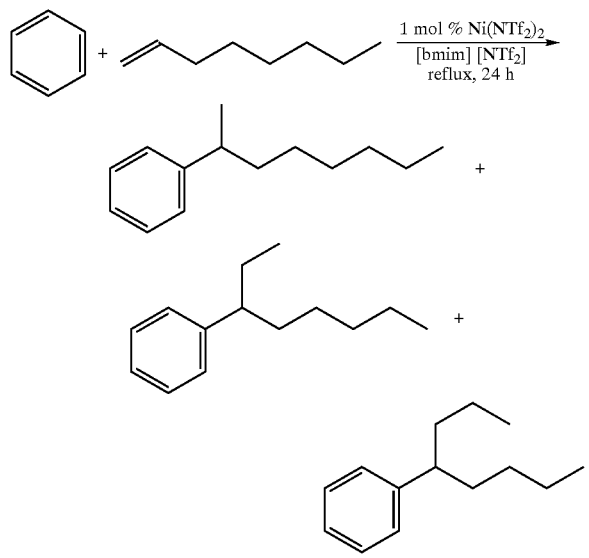

The Alkylation of Benzene with oct-1-ene.

The reaction gave a 70% yield (by GC) of three isomers of octylbenzene. The isomer ratio was determined to be 0.75:1.00:2.03, with the 4-phenyloctene as the major product and 2-phenyloctene as the minor product. During the course of the reaction, isomeration of oct-1-ene to a number of isomers of octene was observed, and the rate of this isomerisation process was considerably faster that the alkylation reaction. It was found that the ionic liquid/catalyst combination remained active on a second run. To confirm that the minor product of the reaction was an octene dimer, the same reaction was performed, but without any benzene present (shown below).

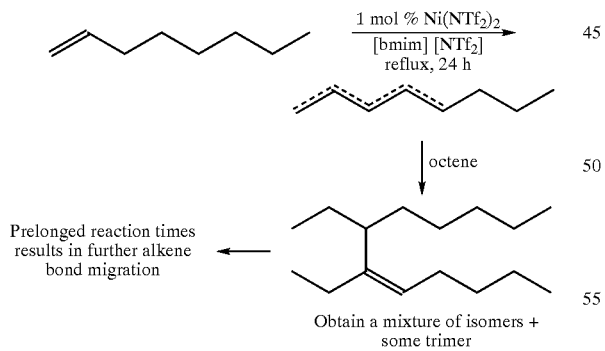

The Dimerisation of oct-1-ene.

The reaction proceeded initially with isomerisation of octene to a mixture of 4 isomers of octane. After 18 hours, the reaction was almost complete (>95% conversion). The products were a large number of isomers of dimerised and trimerised octene. As the reaction was left to run for 6 days, a broadening of the cluster of GC peaks for the dimer and trimer was observed, indicating that further isomerisation was occurring.

EXAMPLE 20

The Dimerisation of oct-1-ene with Nickel(II) bis-triflimide

Nickel(II) bis-triflimide (0.062 g, 0.1 mmol) was dissolved in [bmim][NTf$_2$] (0.5 g) in a round-bottomed flask equipped with a magnetic stirrer and reflux condenser. Oct-1-ene (1.12 g, 10 mmol) was added. The mixture was heated under reflux for 18 hours and was analysed by gas chromatographic analysis as in previous examples. The oct-1-ene peak disappeared and three isomers of octene (oct-2-ene, oct-3-ene and oct-4-ene) were formed. Hydrogen bis-triflimide was added (0.0028 g, 0.1 mmol) and the mixture was heated for a further 18 hours. Gas chromatographic analysis showed that the reaction was almost complete (>99%), and gave a mixture of isomers of hexadecene and tetracosene (trimer of octene). The less dense product phase was decanted from the ionic/catalyst phase and purified by Kugelrohr distillation at 1 mm Hg. The ionic liquid and catalyst were prepared for reuse by heating at 60° C. under vacuum for 1 hour. The ionic liquid and catalyst were used for further dimerisation reactions of oct-1-ene without loss of activity.

EXAMPLE 21

The Fries Rearrangement of 4-methylphenoxybenzoate with Hydrogen and Metal bis-triflimide Compounds Ytterbium(III) bis-triflimide (0.1 g) and hydrogen bis-triflimide (0.01 g) was dissolved in [n-H$_{29}$C$_{14}$(n-H$_{13}$C$_6$)$_3$P][NTf$_2$] (1.0 g) in a round-bottomed flask equipped with a magnetic stirrer and reflux condenser. 4-methylphenoxybenzoate (1.0 g) was added. The mixture was heated under reflux for 24 hours at 60° C. and was analysed by gas chromatographic analysis as in previous examples. The product of the reaction was 2-hydroxy-5-methylbenzophenone (90% yield). The isomerisation of 4-methylphenoxybenzoate to 2-hydroxy-5-methylbenzophenone is shown below.

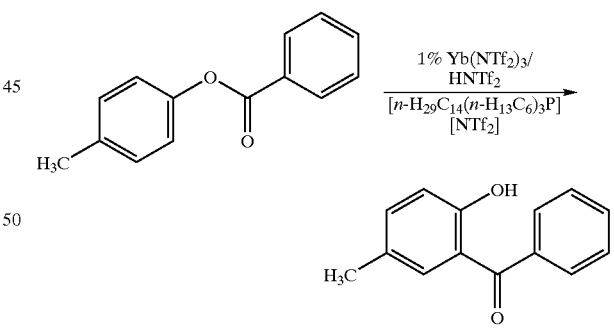

EXAMPLE 22

The Reaction of o-xylene, m-xylene, Mesitylene, and Toluene with Cyclohexene with Metal bis-triflimide Compounds In four separate reaction vessels, ytterbium(III) bis-triflimide (0.1 g) was dissolved in [n-H$_{29}$C$_{14}$(n-H$_{13}$C$_6$)$_3$P][NTf$_2$] (2.0 g) in a round-bottomed flask equipped with a magnetic stirrer and reflux condenser. Either o-xylene (1.06 g, 10 mmol), m-xylene (1.06 g, 10 mmol), mesitylene (1.20 g, 10 mmol), or toluene (0.92 g, 10 mmol) were added to the separate flasks followed by addition of cyclohexene (0.82 g, 10 mmol). The mixtures were heated at 80° C. for 12 hours and were analysed by gas chromatographic analysis as in previous examples. The cyclohexene peak disappeared and peak(s) due to alkylation of the aromatic compound and peaks due to dimerisation reactions of cyclohexene were formed (see Example 26). The ionic liquid and catalyst were prepared for reuse by heating at 60° C. under vacuum for 1 hour. The ionic liquid and catalyst were used for further reactions of benzene with cyclohexene without loss of activity.

EXAMPLE 23

The Reaction of Benzene with dodec-1-ene with Metal bis-triflimides, Triflates and Hydrogen bis-triflimide In ten separate reaction vessels (a multi-cell glass reactor with stirrers and condensers) metal triflimide or metal triflate compounds (see Table below) were added together with hydrogen bis-triflimide (0.01 g) to $[n-H_{29}C_{14}(n-H_{13}C_6)_3P]$ $[NTf_2]$ (2.0 g) and stirred until the metal compound had dissolved. Benzene (3.8 g, 50 mmol) and dodec-1-ene (0.84 g, 5.0 mmol) were added. The mixtures were heated at 80° C. for 24 hours. The excess benzene was distilled off. The mixture was analysed by NMR upon cooling to room temperature. The ionic liquid and catalyst were prepared for reuse by heating at 60° C. under vacuum for 1 hour. The ionic liquid and catalyst were used for further reactions of benzene with dodec-1-ene without loss of activity. The results are shown in Table 8 below.

TABLE 8

| Compound | Mass/g | Unreacted dodecene | Isomerised dodecene | Dodecyl benzene |
|---|---|---|---|---|
| $Yb(NTf_2)_3$ | 1.02 | 0 | 0 | 100 |
| $Co(NTf_2)_2$ | 0.62 | 0 | 99 | 1 |
| $Cu(NTf_2)_2$ | 0.62 | 0 | 1 | 99 |
| $Pb(NTf_2)_2$ | 0.76 | 0 | 100 | 0 |
| $In(NTf_2)_3$ | 0.95 | 0 | 0 | 100 |
| $Ga(NTf_2)_3$ | 0.63 | 0 | 61 | 39 |
| $Zn(OTf_2)_2$ | 0.36 | 67 | 33 | 0 |
| $Cu(OTf_2)_2$ | 0.36 | 1 | 96 | 3 |
| $Yb(OTf_2)_3$ | 0.53 | 0 | 91 | 9 |
| $La(OTf_2)_3$ | 0.59 | 0 | 60 | 40 |

EXAMPLE 24

The Reaction of Toluene with Benzoyl Chloride with Metal Compounds Dissolved in [bmim][NTf$_2$]

Figure 4:
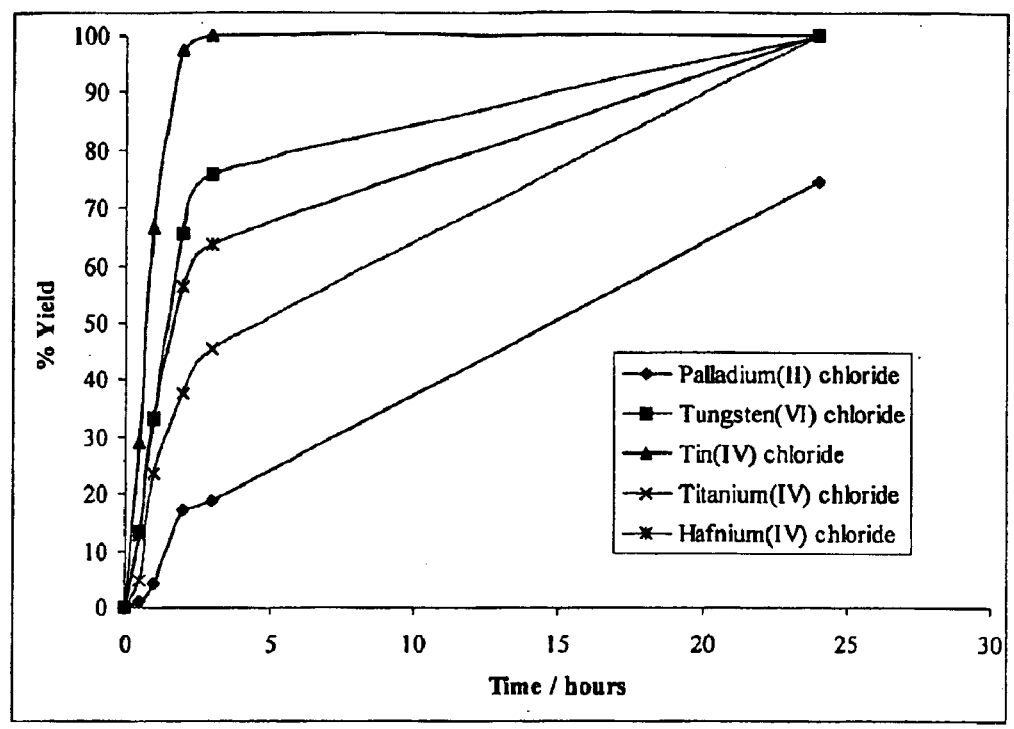
FIG. 4 shows the variation of yield with time for five reaction catalysed by 1 mol % metal chlorides dissolved in [bmim][$NTf_2$] for the reaction of toluene with benzoyl chloride to give methyl benzophenone at 110° C.

In five separate reactions, either titanium(IV) chloride (1 mol %) or tin(IV) chloride (1 mol %), or tungsten(VI) chloride, or hafnium(IV) chloride or palladium(II) chloride was added to 1-butyl-3-methylimidazolium bis-trifluoromethanesulfonimide ([bmim][NTf$_2$]) (2.0 g) 25 cm$^3$ in a round-bottomed flask equipped with a magnetic stirrer and reflux condenser, and the toluene (2.81 g, 30 mmol) and benzoyl chloride (2.84 g, 20 mmol) were added. The mixtures was heated under reflux for 24 hours and was analysed by gas chromatographic analysis as in previous examples. The conversion of starting materials to methylbenzophenone was quantitative except for the palladium(II) catalysed reaction (75% yield). The variation of yield with time in the reaction of several new metal bis-triflimide salts in the reaction of benzoyl chloride with toluene in given in FIG. 4. These reactions were performed in parallel, and the yields were determined by GC analysis. This reaction are given in more detail in examples 45 to 50.

In this invention, the use of a metal halide dissolved in a bis-triflimide ionic liquid can be used for reactions such as the Friedel-Crafts reactions. This is useful where a particular metal bis-triflimide salt is difficult to prepare or isolate. In this invention, five metal halides (chlorides) (1 mol % with respect to the reactants) were dissolved in [bmim][NTf$_2$]. This combination was used to catalyse the reaction of toluene with benzoyl chloride to give methylbenzophenone. The yield with respect to time is given in FIG. 4. All of the metals chosen gave the expected products in good yield, but the combination of 1% mol tin(IV) chloride in [bmim] [NTf$_2$] was a particularly effective catalyst. This process of using metal compounds dissolved in an ionic liquid (usually bis-triflimide) can also be used with compounds of other metals (particularly transition metals (d-block) or f-block metals)) not listed in FIGS. 3 or 4.

EXAMPLE 25

A number of aromatic sulfonylation reactions were performed. These reactions are very similar to Friedel-Crafts acylation reactions and are performed under similar conditions. The key difference is that a —SO$_2$—X group replaces a —CO—X (X=leaving group). In most cases, the selectivities, reactivities and yields were found similar to the corresponding acylation reaction. The reaction of sulfuryl chloride with benzene resulted in the formation of chlorobenzene (quantitatively) and SO$_2$. This is as is found in many other reactions of SO$_2$Cl$_2$ with aromatic compounds performed in molecular solvents.

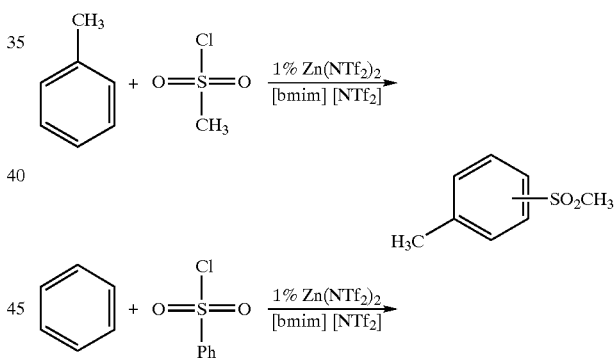

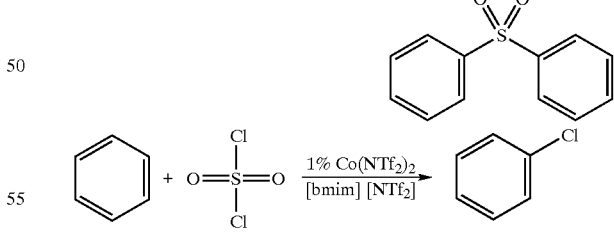

EXAMPLE 26

The alkylation of various aromatic compounds with cyclohexene in a phosphonium ionic liquid with 10% ytterbium(III) bis-triflimide with a trace of hydrogen bis-triflimide were carried out. A side reaction also takes place that results in the formation of a dimer of cyclohexene (see below) and this results in a slight reduction in the yield of the Friedel-Crafts reaction. However, is should be noted that this demonstrates that metal triflimide compounds can be used for dimerisation and oligomerisation reactions.

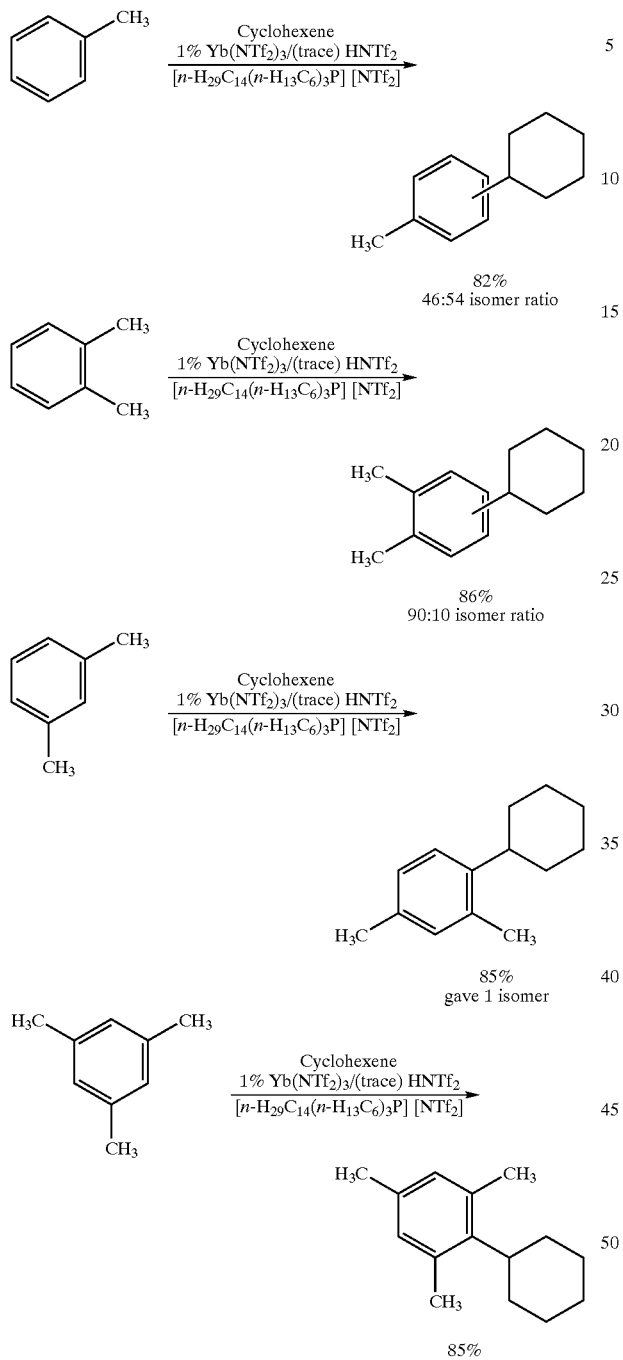

The reaction of aromatics with cyclohexene in a phosphonium ionic liquid for 12 hours at 80° C. is shown above. Below is shown the dimerisation of cyclohexene.

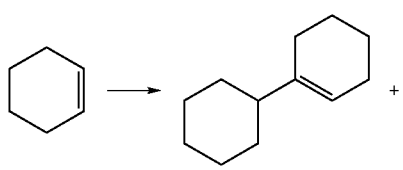

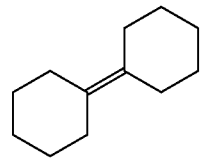

EXAMPLE 27

Preparation of Magnesium bis-triflimide. Magnesium (0.048 g, 2.0 mmol) was added to a solution of (hydrogen) bis-triflimide ($HN(SO_2CF_3)_2$, 1.12 g, 4.0 mmol) in distilled water (5 g) in a 25 $cm^3$ round bottomed flash equipped with a magnetic stirrer. The mixture was stirred for 1 hour (judged to be complete when the evolution of hydrogen ceased), and was filtered. The water was evaporated on a rotary evaporator, and the magnesium bis-triflimide dried by heating at 150° C. at 1 mmHg for 4 hours in a vacuum drying apparatus, to give a white powder (1.10 g, 95%). The magnesium bis-triflimide was purified by vacuum sublimation at 300° C. at 1 mmHg in a Kugelrohr apparatus. The unpurified magnesium bis-triflimide was found to be a Friedel-Crafts catalyst for the reaction of anisole and benzoyl chloride. The catalytic activity was similar to that of $Zn(NTf_2)_2$. $Mg(NTf_2)_2$ was found to be a good sulfonation catalyst in the reaction of benzene sulfonyl chloride with chlorobenzene.

EXAMPLE 28

Preparation of Aluminium(III) bis-triflimide.

Aluminium dust (0.030 g, 1.15 mmol) was added to a solution of bis-triflimide ($HN(SO_2CF_3)_2$, 0.84 g, 3.0 mmol) in distilled water (5 g) in a 25 $cm^3$ round bottomed flash equipped with a magnetic stirrer. This was heated under reflux for 0.5 hours. The mixture was cooled to room temperature and was filtered to remove excess aluminium. The water was evaporated on a rotary evaporator, and the aluminium bis-triflimide dried by heating at 150° C. at 1 mmHg for 4 hours in a vacuum drying apparatus, to give a white powder (0.83 g, 96%). The aluminium bis-triflimide was purified by vacuum sublimation at 350° C. at 1 mmHg in a Kugelrohr apparatus (some decomposition occurred). The unpurified aluminium bis-triflimide was found to be a Friedel-Crafts catalyst for the reaction of anisole or xylene and benzoyl chloride. The catalytic activity was similar to $Zn(NTf_2)_2$.

EXAMPLE 29

Preparation of Manganese(II) bis-triflimide.

Manganese(II) carbonate (0.18 g, 1.6 mmol) was added to a solution of bis-triflimide ($HN(SO_2CF_3)_2$, 0.84 g, 3.0 mmol) in distilled water (5 g) in a 25 $cm^3$ round bottomed flash equipped with a magnetic stirrer. This was stirred for 0.5 hours (until the evolution of $CO_2$ ceased. The mixture was filtered to remove excess manganese carbonate. The water was evaporated on a rotary evaporator, and the manganese(II) bis-triflimide dried by heating at 150° C. at 1 mmHg for 4 hours in a vacuum drying apparatus, to give an almost white powder (0.90 g, 97%). The manganese(II) bis-triflimide was purified by vacuum distillation/sublimation at 280° C. at 1 mmHg in a Kugelrohr apparatus (this temperature and pressure appears to be very close to the triple point of this material ie melting point=boiling point). The unpurified manganese(II) bis-triflimide was found to be an excellent Friedel-Crafts catalyst for the reaction of toluene and benzoyl chloride. The catalytic activity was greater than $Zn(NTf_2)_2$.

EXAMPLE 30
Preparation of Nickel(II) bis-triflimide.

Nickel(II) hydroxide (0.15 g, 1.6 mmol) was added to a solution of bis-triflimide ($HN(SO_2CF_3)_2$, 0.84 g, 3.0 mmol) in distilled water (5 g) in a 25 cm$^3$ round bottomed flash equipped with a magnetic stirrer. This was stirred for 1 hour (until the hydroxide mostly dissolved to give a green solution). The mixture was filtered to remove excess nickel hydroxide. The water was evaporated on a rotary evaporator, and the nickel(II) bis-triflimide dried by heating at 150° C. at 1 mmHg for 4 hours in a vacuum drying apparatus, to give a very pale yellow powder (0.90 g, 97%). The nickel(II) bis-triflimide was purified by vacuum distillation/sublimation at 280° C. at 1 mmHg in a Kugelrohr apparatus (see FIG. 6). The unpurified nickel(II) bis-triflimide was found to be an excellent Friedel-Crafts catalyst for the reaction of toluene and benzoyl chloride. The catalytic activity was greater than $Zn(NTf_2)_2$.

EXAMPLE 31
Preparation of Cobalt(II) bis-triflimide.

Cobalt(II) carbonate (0.19 g, 1.6 mmol) was added to a solution of bis-triflimide ($HN(SO_2CF_3)_2$, 0.84 g, 3.0 mmol) in distilled water (5 g) in a 25 cm$^3$ round bottomed flash equipped with a magnetic stirrer. This was stirred for 1 hour (until the evolution of $CO_2$ ceased to give a pink solution). The mixture was filtered to remove excess cobalt carbonate. The water was evaporated on a rotary evaporator, and the cobalt(II) bis-triflimide dried by heating at 150° C. at 1 mmHg for 4 hours in a vacuum drying apparatus, to give a pale pink powder (0.90 g, 97%). The cobalt(II) bis-triflimide was purified by vacuum distillation/sublimation at 300° C. at 1 mmHg in a Kugelrohr apparatus. The unpurified cobalt(II) bis-triflimide was found to be an excellent Friedel-Crafts catalyst for the reaction of toluene and benzoyl chloride. The catalytic activity was greater than $Zn(NTf_2)_2$. Also this is one of the few Friedel-Crafts acylation catalysts that was found to catalyse the acylation of chlorobenzene with benzoyl chloride.

EXAMPLE 32
Preparation of Copper(II) bis-triflimide.

Copper(II) carbonate (0.20 g, 1.6 mmol) was added to a solution of bis-triflimide ($HN(SO_2CF_3)_2$, 0.84 g, 3.0 mmol) in distilled water (5 g) in a 25 cm$^3$ round bottomed flash equipped with a magnetic stirrer. This was stirred for 1 hour (until the evolution of $CO_2$ ceased to give a blue/green solution). The mixture was filtered to remove excess copper (II) carbonate. The water was evaporated on a rotary evaporator, and the copper(II) bis-triflimide dried by heating at 150° C. at 1 mmHg for 4 hours in a vacuum drying apparatus, to give a very pale green/blue powder (0.89 g, 95%). The copper(II) bis-triflimide was purified by vacuum distillation/sublimation at 180° C. at 1 mmHg in a Kugelrohr apparatus (partial decomposition occurs during sublimation and approximately half the copper(II bis-triflimide is lost). The unpurified copper(II) bis-triflimide was found to be a Friedel-Crafts catalyst for the reaction of toluene, anisole and xylene with benzoyl chloride (activity was less than $Zn(NTf_2)_2$). The copper(II) bis-triflimide was also found to be a good Friedel-Crafts alkylation catalyst.

EXAMPLE 33
Preparation of Zinc(II) bis-triflimide.

Zinc (0.13 g, 2.0 mmol) was added to a solution of bis-triflimide ($HN(SO_2CF_3)_2$, 0.84 g, 3.0 mmol) in distilled water (5 g) in a 25 cm$^3$ round bottomed flash equipped with a magnetic stirrer. This was stirred for 1 hour. (until the evolution of $H_2$ ceased to give a colourless solution). The mixture was filtered to remove excess zinc. The water was evaporated on a rotary evaporator, and the zinc(II) bis-triflimide dried by heating at 150° C. at 1 mmHg for 4 hours in a vacuum drying apparatus, to give a white crystals (0.91 g, 97%). One of these crystals was submitted for x-ray crystallographic analysis and its structure shown in FIGS. 5 to 7. The zinc(II) bis-triflimide was purified by vacuum distillation/sublimation at 260° C. at 1 mmHg in a Kugelrohr apparatus. The unpurified zinc(II) bis-triflimide was found to be a good Friedel-Crafts catalyst for the reaction of toluene, anisole and xylene with benzoyl chloride, and benzoic acid with xylene. Also this is one of the few Friedel-Crafts acylation catalysts that was found to catalyse the acylation of chlorobenzene with benzoyl chloride.

EXAMPLE 34
Indium(III) Bis-triflimide 5.0 g of Indium (III) hydroxide was dissolved in 50 ml of water and to which 27.0 g of $HNTf_2$ was added and stirred at room temperature for 24 hours. The reaction mixture was filtered and the filtrate was concentrated on a rotary evaporator and dried under vacuum (1 mmHg) for 3 days at 120° C. The unpurified indium(III) bis-triflimide was found to be an excellent Friedel-Crafts catalyst for the reaction of toluene, anisole and xylene with benzoyl chloride or benzoic anhydride.

EXAMPLE 35
Gallium(III) Triflamide 2.5 g of Gallium (III) oxide was suspended in 50 ml of water to which 24.0 g trifluoromethane sulfonimide was added and heated at 100° C. for two days. The reaction mixture was filtered and the filtrate was concentrated on a rotary evaporator and dried under vacuum (1 mmHg) for 3 days at 120° C. The unpurified gallium(III) bis-triflimide was found to be an excellent Friedel-Crafts catalyst for the reaction of toluene, anisole and xylene with benzoyl chloride or benzoic anhydride.

EXAMPLE 36
Calcium Bis-triflimide 1.0 g of calcium(II) carbonate was suspended in 50 mL of water, to which freshly prepared $HNTf_2$ (5.6 g) was added and stirred at room temperature for 24 hours. The reaction mixture was filtered and the filtrate was concentrated on a rotary evaporator and dried under vacuum (1 mmHg) for 4 hours at 150° C. The unpurified calcium bis-triflimide was found to display poor catalytic activity in Friedel-Crafts reactions.

EXAMPLE 37
Strontium(II Bis-triflimide 1.0 g of strontium(II) carbonate was suspended in 50 mL of water, to which freshly prepared $HNTf_2$ (3.8 g) was added and stirred at room temperature for 24 hours. The reaction mixture was filtered and the filtrate was concentrated on a rotary evaporator and dried under vacuum (1 mmHg) for 4 hours at 150° C. The unpurified strontium(II) bis-triflimide was found to display poor catalytic activity in Friedel-Crafts reactions, but was slightly more active than the calcium analogue.

EXAMPLE 38
Barium Bis-triflimide 1.0 g of Barium(II) carbonate was suspended in 50 mL of water, to which freshly prepared $HNTf_2$ (2.8 g) was added and stirred at room temperature for 24 hours. The reaction mixture was filtered and the filtrate was concentrated on a rotary evaporator and dried under vacuum (1 mmHg) for 4 hours at 150° C. The unpurified barium(II) bis-triflimide was found to display some catalytic activity in Friedel-Crafts reactions, and was more active than the calcium and strontium analogues.

EXAMPLE 39
Tin(II) bis-triflimide Procedure 1

Tin metal (5.0 g, 99.9% purity) lumps were suspended in water (50 mL) and hydrogen bis-triflimide (HNTf$_2$) (10 g) was added. This mixture was heated under reflux for 72 hours. The resultant mixture was cooled, filtered and concentrated on a rotary evaporator to give a colourless solution that crystalised on standing. The off white crystals were heated at 150° C. at 1 mmHg to remove the residual water and hydrogen bis-triflimide. The unpurified tin(II) bis-triflimide was found to display catalytic activity in Friedel-Crafts reactions (eg 1% Sn(NTf$_2$)$_2$+toluene+benzoyl chloride gave 99% yield after 48 hours under reflux). The reactivity was similar to that of zinc bis-triflimide.

EXAMPLE 40
Tin(II) Bis-triflimide Procedure 2

Tin(II) oxide (1.0 g) powder was suspended in water (50 mL) and hydrogen bis-triflimide (HNTf$_2$) (5.0 g) was added. This mixture was heated under reflux for 48 hours. The resultant slurry was cooled, filtered and concentrated on a rotary evaporator to give a colourless solution that gave an off white precipitate on standing. The off white precipitate was heated at 150° C. at 1 mmHg to remove the residual water and hydrogen bis-triflimide. The unpurified tin(II) bis-triflimide was found to display catalytic activity in Friedel-Crafts reactions (eg 1% Sn(NTf$_2$)$_2$+toluene+benzoyl chloride gave 99% yield after 6 hours under reflux).

EXAMPLE 41
Lead(II) Bis-triflimide 13.0 g of lead(II) carbonate was taken in 50 mL of water, to which freshly prepared 28.0 g of HNTf$_2$ was added and stirred at room temperature for 24 hours. The reaction mixture was filtered and the filtrate was concentrated on a rotary evaporator and dried under vacuum (1 mmHg) for 3 days at 120° C. The unpurified lead(II) bis-triflimide was found to display good catalytic activity in Friedel-Crafts reactions (eg 1% Pb(NTf$_2$)$_2$+toluene+benzoyl chloride gave 99% yield after 48 hours under reflux). The catalytic activity was better than zinc(II) bis-triflimide.

EXAMPLE 42
Chromium(III) Bis-triflimide

Chromium metal (1.0 g, 99.95% purity) pieces were suspended in water (20 mL) and hydrogen bis-triflimide (HNTf$_2$) (5 g) was added. This mixture was heated under reflux for 144 hours. The resultant mixture was cooled, filtered and concentrated on a rotary evaporator to give a green solid. The solid were heated at 150° C. at 1 mmHg to remove the residual water and hydrogen bis-triflimide. The solid was thought to contain an oxo chromium bis-triflimide species CrO(NTf$_2$) from the mass of HNTf$_2$ produced in drying process. The unpurified chromium(III) bis-triflimide was found to display catalytic activity in Friedel-Crafts reactions, and was similar in activity to Zn(NTf$_2$)$_2$.

EXAMPLE 43
Tungsten Bis-triflimide

Tungsten metal (1.0 g, 99% purity) filings were suspended in water (20 mL) and hydrogen bis-triflimide (HNTf$_2$) (5 g) was added. This mixture was heated under reflux for 144 hours. The resultant slurry was cooled, filtered and concentrated on a rotary evaporator to give a colourless solution that crystalised on standing. The crystals were heated at 150° C. at 1 mmHg to remove the residual water and hydrogen bis-triflimide. The precise structure of the catalyst is not known, but it was found to be the best of all isolated metal bis-triflimide catalysts tested in the reaction of benzoyl chloride with toluene.

EXAMPLE 44
Iron(II) Bis-triflimide

Iron metal (5.0 g, 99.95% purity) lumps were suspended in water (50 mL) and hydrogen bis-triflimide (HNTf$_2$) (10 g) was added. This mixture was heated under reflux for 72 hours. The resultant slurry was cooled, filtered and concentrated on a rotary evaporator to give a pale yellow solution that crystalised on standing. The pale yellow crystals were heated at 150° C. at 1 mmHg to remove the residual water and hydrogen bis-triflimide.

EXAMPLE 45
Iron(III) Bis-triflimide

This compound can be isolated in two forms as either cream coloured crystals (thought to be Fe(NTf$_2$)$_2$(OH)(OH$_2$)) or a brown solid (thought to be FeO(NTf$_2$)). To a solution of iron(III) nitrate (10 g) in water was added sodium hydroxide solution (1 M) until a brown precipitate had formed. The precipitate of hydrated iron(III) hydroxide was collected by vacuum filtration and washed with water. The precipitate (approximately 5 g) was suspended in distilled water and excess hydrogen bis-triflimide was added (20 g). The precipitate slowly dissolved to give a clear pale brown solution. The solution was filtered and concentrated on a rotary evaporator, and transferred to a kugelrohr distillation apparatus. The unreacted hydrogen bis-triflimide was distilled out at 100° C., 1 mmHg, leaving a cream coloured crystalline solid of hydrated iron(III) bis-triflimide. Further heating at 170° C., 1 mmHg for 4 hours, resulted in the evolution of hydrogen bis-triflimide, and a brown solid was formed (FeO(NTf$_2$)). Both of these solids were found to be excellent Friedel-Crafts catalysts for the reaction of toluene with benzoyl chloride at 1 mol % concentration.

EXAMPLE 46
The in situ Preparation Metal bis-triflimide Compounds, Based on Palladium(II) and bis-triflimide Ions Palladium(II) chloride (0.035 g) was added to 1-butyl-3-methylimidazolium bis-trifluoromethanesulfonimide ([bmim][NTf$_2$]) (2.0 g) 25 cm$^3$ in a round-bottomed flask, equipped with a magnetic stirrer and reflux condenser. This was heated gently, with stirring until the palladium(II) chloride had dissolved, to give an yellow/orange coloured clear solution. This solution was then used as a Friedel-Crafts acylation catalyst.

The catalytic activity of the palladium(II) chloride/[bmim][NTf$_2$] combination was tested in the reaction of toluene (2.81 g, 30 mmol) with benzoyl chloride (2.84 g, 20 mmol). The mixtures was heated under reflux for 24 hours and was analysed by gas chromatographic analysis. This gave methyl benzophenone (75% yield and 4.5 : 1 p- to o-ratio).

EXAMPLE 47
The in situ Preparation Metal bis-triflimide Compounds, Based on Tungsten(IV) and bis-triflimide Ions Tungsten(VI) chloride (0.079 g) was added to 1-butyl-3-methylimidazolium bis-trifluoromethanesulfonimide ([bmim][NTf$_2$]) (2.0 g) 25 cm$^3$ in a round-bottomed flask, equipped with a magnetic stirrer and reflux condenser. This was heated gently, with stirring until the tungsten(VI) chloride had dissolved, to give an clear solution. This solution was then used as a Friedel-Crafts acylation catalyst.

The catalytic activity of the tungsten(VI) chloride/[bmim] [NTf$_2$] combination was tested in the reaction of toluene (2.81 g, 30 mmol) with benzoyl chloride (2.84 g, 20 mmol). The mixtures was heated under reflux for 24 hours and was analysed by gas chromatographic analysis. This gave methyl benzophenone (99% yield and 4.1:1 p- to o-ratio).

EXAMPLE 48

The in situ Preparation Metal bis-triflimide Compounds, Based on tin(IV) and bis-triflimide Ions Tin(IV) chloride (0.052 g) was added to 1-butyl-3-methylimidazolium bis-trifluoromethanesulfonimide ([bmim][NTf$_2$]) (2.0 g) 25 cm$^3$ in a round-bottomed flask, equipped with a magnetic stirrer and reflux condenser. This was stirred until the tin(IV) chloride had dissolved, to give an clear solution.

This solution was then used as a Friedel-Crafts acylation catalyst.

The catalytic activity of the tin(IV) chloride/[bmim] [NTf$_2$] combination was tested in the reaction of toluene (2.81 g, 30 mmol) with benzoyl chloride (2.84 g, 20 mmol). The mixtures was heated under reflux for 24 hours and was analysed by gas chromatographic analysis. This gave methyl benzophenone (99% yield and 4.2 : 1 p- to o-ratio).

EXAMPLE 49

The in situ Preparation Metal bis-triflimide Compounds, Based on Titanium(IV) and bis-triflimide Ions Titanium(IV) chloride (0.038 g) was added to 1-butyl-3-methylimidazolium bis-trifluoromethanesulfonimide ([bmim][NTf$_2$]) (2.0 g) 25 cm$^3$ in a round-bottomed flask, equipped with a magnetic stirrer and reflux condenser. This was stirred until the titanium(IV) chloride had dissolved, to give an clear solution. This solution was then used as a Friedel-Crafts acylation catalyst.

The catalytic activity of the titanium(IV) chloride/[bmim] [NTf$_2$] combination was tested in the reaction of toluene (2.81 g, 30 mmol) with benzoyl chloride (2.84 g, 20 mmol). The mixtures was heated under reflux for 24 hours and was analysed by gas chromatographic analysis. This gave methyl benzophenone (99% yield and 4.5:1 p- to o-ratio).

EXAMPLE 50

The in situ Preparation Metal bis-triflimide Compounds, Based on Hafnium (IV) and bis-triflimide Ions Hafnium(IV) chloride (0.064 g) was added to 1-butyl-3-methylimidazolium bis-trifluoromethanesulfonimide ([bmim][NTf$_2$]) (2.0 g) 25 cm$^3$ in a round-bottomed flask, equipped with a magnetic stirrer and reflux condenser. This was stirred until the hafnium(IV) chloride had dissolved, to give an clear solution. This solution was then used as a Friedel-Crafts acylation catalyst.

The catalytic activity of the hafnium(IV) chloride/[bmim] [NTf$_2$] combination was tested in the reaction of toluene (2.81 g, 30 mmol) with benzoyl chloride (2.84 g, 20 mmol). The mixtures was heated under reflux for 24 hours and was analysed by gas chromatographic analysis. This gave methyl benzophenone (99% yield and 4.42:1 p- to o-ratio).

What is claimed is:

1. A metal bis-triflimide compound having the formula:

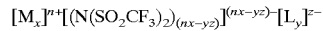

$$[M_x]^{n+}[(N(SO_2CF_3)_2)_{(nx-yz)}]^{(nx-yz)-}[L_y]^{z-}$$

where M is a metal selected from, Ga, In, Pb, Pm, Sm, Gd, Tb, Ho, Er, Tm, Lu and the actinides;

L is a negative or neutral ligand;

n is 2,3,4,5,6,7 or 8;

x is greater than or equal to 1 y is 0,1,2,3,4,5,6,7 or 8; and z is 0,1,2,3 or 4.

2. A compound according to claim 1 wherein M is selected from Ga, In and Pb.

3. A compound according to claim 2 wherein M is selected from Ga(III), In (III), Pb(II) and In(II).

4. A process for the vapour deposition of metals onto solid surfaces which process utilises as a catalyst a metal bis-triflimide compound according to claim 1.

5. A process for purifying a metal bis-triflimide compound according to claim 1 by comprising sublimating the metal bis-triflimide compound.

6. A process for the production of metal bistriflimide compounds which process comprises reacting (a) hydrogen bistriflimide with a metal;

(b) hydrogen bistriflimide with a metal hydroxide;

(c) hydrogen bistriflimide with a metal sulfide; or (d) hydrogen bistriflimide with a metal carbide.

7. A process for the production of a metal bistriflimide catalyst comprising adding metal compound to a source of a bistriflimide ion in the form of a bistriflimide ionic liquid.

8. A process according to claim 7 further comprising sublimating the reaction product to recover the metal bis-triflimide.

9. A bistriflimide catalyst obtainable by the process of claim 7.

10. A process for carrying out an electrophillic substitution reaction of an aromatic ring or an isomerisation, polymerisation or rearrangement to a chemical compound or molecule which process is catalysed by the compound of claim 2.

11. A process for carrying out an electrophillic substitution reaction of an aromatic ring or an isomerisation, polymerisation or rearrangement to a chemical compound or molecule which process is catalysed by the compound of claim 3.

12. A process for the vapour deposition of metals onto solid surfaces which process utilises as a catalyst a metal bis-triflimide compound according to claim 2.

13. A process for the vapour deposition of metals onto solid surfaces which process utilises as a catalyst a metal bis-triflimide compound according to claim 3.

14. A process for purifying a metal bis-triflimide compound according to claim 2 comprising sublimating the metal bistriflimide compound.

15. A process for purifying a metal bis-triflimide compound according to claim 3 comprising sublimating the metal bistriflimide compound.

16. A process for the production of a metal bistriflimide catalyst comprising adding a metal halide compound to a source of a bistriflimide ion in the form of a bistriflimide ionic liquid.

17. A process according to claim 16 wherein the source of bistriflimide ion is an ionic liquid having bis-trifluoromethanesulfonimide or bis-pentafluoroethanesulfonimide is an anion.

18. A process according to claim 16 further comprising sublimating the reaction product to recover the metal bis-triflimide.

19. A process for the production of a metal bis-triflimide catalyst comprising adding a metal compound to an ionic liquid having bis-trifluoromethanesulfonimide or bis-pentafluoroethanesulfonimide as an anion.

20. A process according to claim 19 further comprising sublimating the reaction product to recover the metal bis-triflimide.

21. A bistriflimide catalyst obtainable by the process of claim 7.

22. A bistriflimide catalyst obtainable by the process of claim 16.

23. A bistriflimide catalyst obtainable by the process of claim 8.

24. In a process for carrying out an electrophillic substitution reaction of an aromatic ring or an isomerisation, polymerisation or rearrangement to a chemical compound or molecule, the improvement comprising catalysing and solvating the process by a compound having the formula:

$$[M_x]^{n+}[(N(SO_2CF_3)_2)_{(nx-yz)}]^{(nx-yz)-}[L_y]^{z-}$$

where M is a metal selected from the metals in groups 5 to 10, 12 and 14 to 16 and Cu, Au, Ca, Sr, Ba, Ra, Y, La, Ac, Hf, Rf, Ga, In, Tl, Ce, Pr, Nd, Pm, Sm, Eu, Gd, Tb, Dy, Ho, Er, Tm, Lu and the actinides;

L is a negative or neutral ligand;

n is 2,3,4,5,6,7 or 8;

x is greater than or equal to 1;

y is 0,1,2,3,4,5,6,7 or 8; and z is 0, 1, 2, 3, or 4.

25. A process for the vapour deposition of metals onto solid surfaces which process utilises as a catalyst a metal bis-triflimide compound having the formula:

$$[M_x]^{n+}[(N(SO_2CF_3)_2)_{(nx-yz)}]^{(nx-yz)-}[L_y]^{z-}$$

where M is a metal selected from the metals in groups 5 to 10, 12 and 14 to 16 and Cu, Au, Ca, Sr, Ba, Ra, Y, La, Ac, Hf, Rf, Ga, In, Tl, Ce, Pr, Nd, Pm, Sm, Eu, Gd, Tb, Dy, Ho, Er, Tm, Lu and the actinides;

L is a negative or neutral ligand;

n is 2,3,4,5,6,7 or 8;

x is greater than or equal to 1 y is 0,1,2,3,4,5,6,7 or 8; and z is 0,1,2,3 or 4.

26. A process for purifying a metal bis-triflimide compound having a formula:

$$[M_x]^{n+}[(N(SO_2CF_3)_2)_{(nx-yz)}]^{(nx-yz)-}[L_y]^{z-}$$

where M is a metal selected from the metals in groups 5 to 10, 12 and 14 to 16 and Cu, Au, Ca, Sr, Ba, Ra, Y, La, Ac, Hf, Rf, Ga, In, Tl, Ce, Pr, Nd, Pm, Sm, Eu, Gd, Tb, Dy, Ho, Er, Tm, Lu and the actinides;

L is a negative or neutral ligand;

n is 2,3,4,5,6,7 or 8;

x is greater than or equal to 1 y is 0,1,2,3,4,5,6,7 or 8; and z is 0,1,2,3 or 4, which process comprises sublimating the metal bis-triflimide compound to purify said compound.

* * * * *